United States Patent
Nakagata et al.

(10) Patent No.: US 8,433,067 B2
(45) Date of Patent: Apr. 30, 2013

(54) DEVICE, METHOD, AND PROGRAM FOR IMAGE ENCRYPTION/DECRYPTION

(75) Inventors: Shohei Nakagata, Kawasaki (JP); Kensuke Kuraki, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 642 days.

(21) Appl. No.: 12/425,977

(22) Filed: Apr. 17, 2009

(65) Prior Publication Data

US 2009/0262931 A1    Oct. 22, 2009

Related U.S. Application Data

(63) Continuation of application No. PCT/JP2007/000215, filed on Mar. 13, 2007.

(30) Foreign Application Priority Data

Oct. 31, 2006 (WO) .................. PCT/JP2006/321794

(51) Int. Cl.
*H04N 7/167* (2011.01)
*H04N 1/44* (2006.01)

(52) U.S. Cl.
USPC ........................................ 380/205; 380/243

(58) Field of Classification Search .................. 380/210, 380/216, 201, 205, 206; 358/403–406; 382/173–176, 181, 193, 194, 199, 286, 287; 375/240.01

See application file for complete search history.

(56) References Cited

U.S. PATENT DOCUMENTS

| | | | |
|---|---|---|---|
| 5,159,630 A | 10/1992 | Tseng et al. | |
| 5,287,203 A | 2/1994 | Namizuka | |
| 5,491,563 A * | 2/1996 | Pomerantz | 358/405 |
| 6,839,844 B1 | 1/2005 | Okano | |
| 7,457,419 B2 * | 11/2008 | Hayashi | 380/281 |
| 7,463,736 B2 * | 12/2008 | Tagashira et al. | 380/216 |
| 7,970,139 B2 * | 6/2011 | Hayashi | 380/243 |
| 7,986,784 B2 * | 7/2011 | Dokuni | 380/243 |
| 2008/0279380 A1 * | 11/2008 | Hayashi | 380/243 |
| 2009/0323950 A1 * | 12/2009 | Nakagata et al. | 380/243 |
| 2010/0074443 A1 * | 3/2010 | Ishii et al. | 380/243 |

FOREIGN PATENT DOCUMENTS

| | | |
|---|---|---|
| EP | 1045574 A1 | 10/2000 |
| JP | 5-199424 | 8/1993 |
| JP | 8-179689 | 7/1996 |
| JP | 2938338 | 8/1999 |

(Continued)

OTHER PUBLICATIONS

Extended European Search Report dated Nov. 12, 2012 for corresponding European Application No. 07736874.4.

*Primary Examiner* — Beemnet Dada
(74) *Attorney, Agent, or Firm* — Fujitsu Patent Center

(57) ABSTRACT

In order to encrypt a part of an input image in such a manner that the encrypted part can be located for decryption, means for regularly converting pixel values in the area to be encrypted and generating a pattern unique to the pixel value conversion in order to encrypt the area to be encrypted; means for setting a specified positioning marker for locating an encryption position at two or more of the four corners of the area to be encrypted; and means for setting one or more checking marks for verifying appropriateness of a decrypted image in the encrypted area before the decryption are included.

22 Claims, 29 Drawing Sheets

FOREIGN PATENT DOCUMENTS

| | | | |
|---|---|---|---|
| JP | 2000-232586 | * | 8/2000 |
| JP | 2006-80623 | | 3/2003 |
| JP | 2004-32538 | | 1/2004 |
| WO | 2006/028103 A1 | | 3/2006 |

* cited by examiner

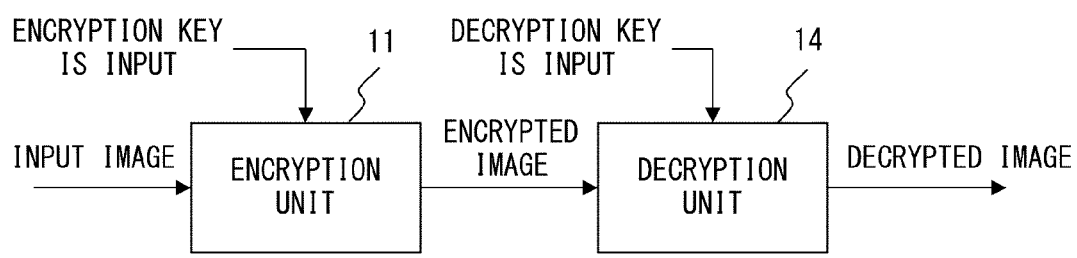
F I G. 2

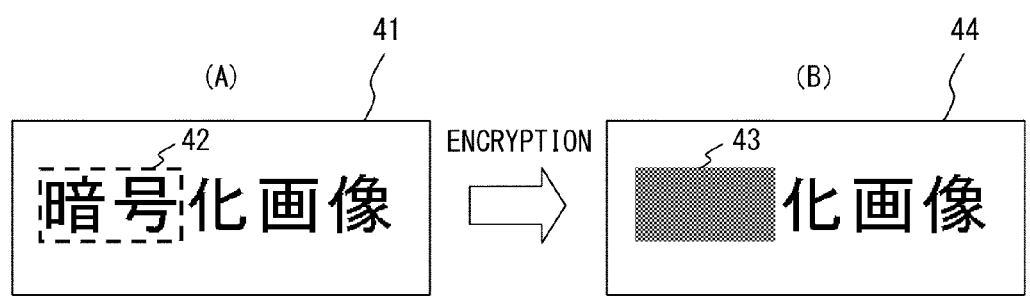
F I G. 4

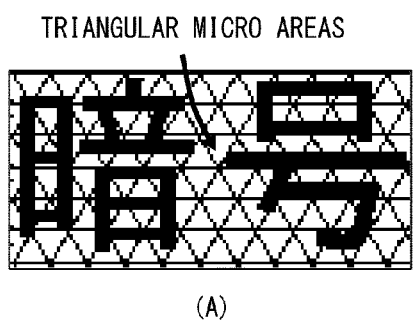 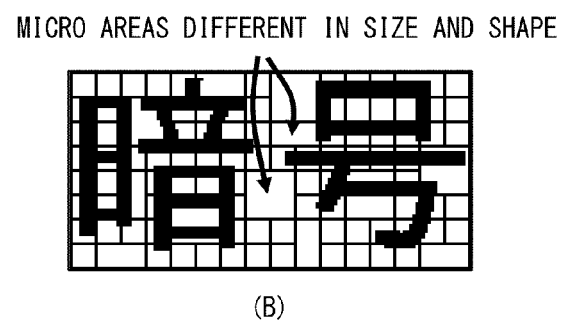
(A) TRIANGULAR MICRO AREAS  (B) MICRO AREAS DIFFERENT IN SIZE AND SHAPE
F I G. 8

(A) 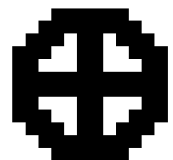 (B) 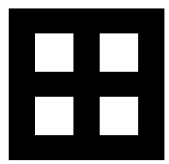 (C)  (D) 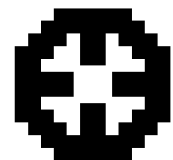
F I G. 1 3

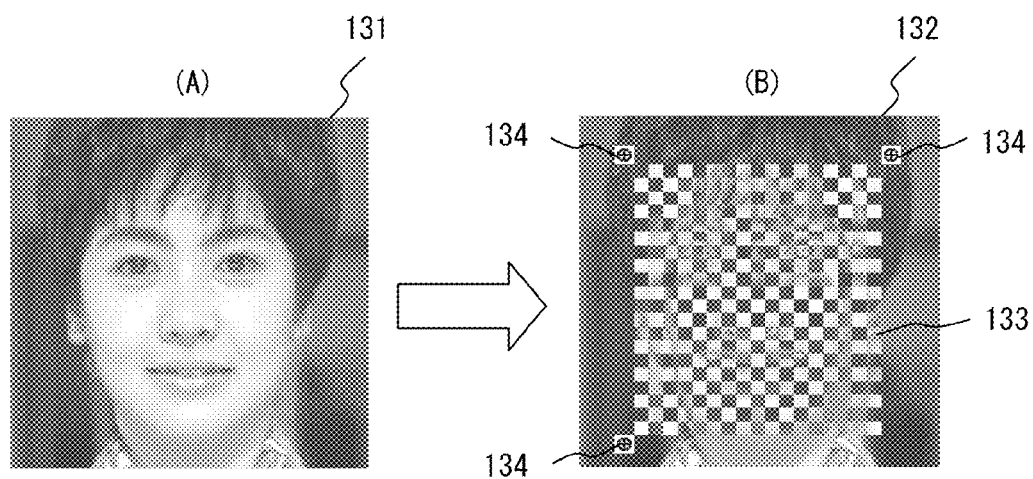
F I G. 1 5

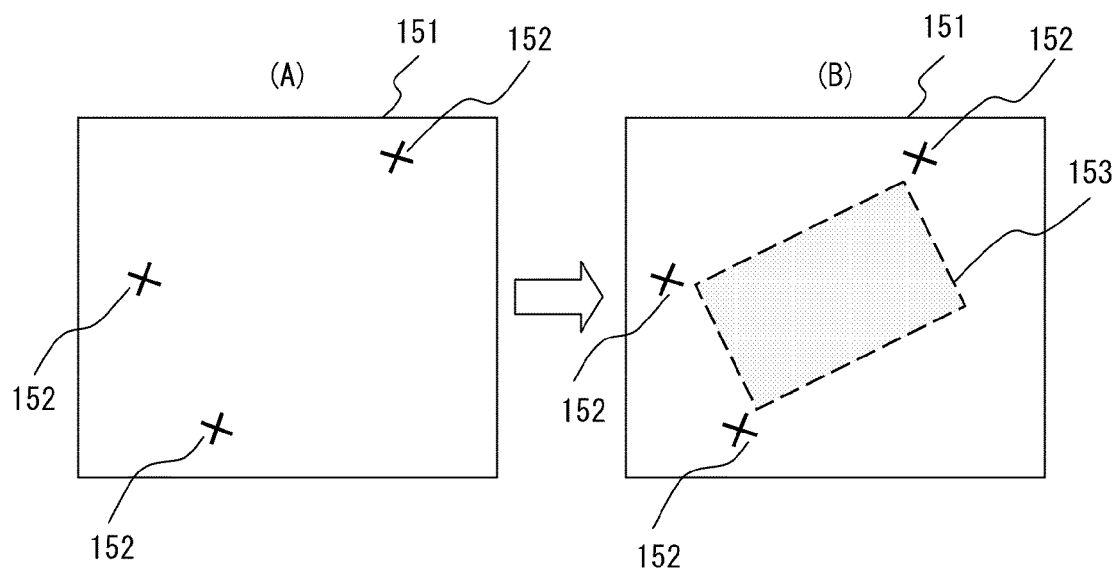
F I G. 17

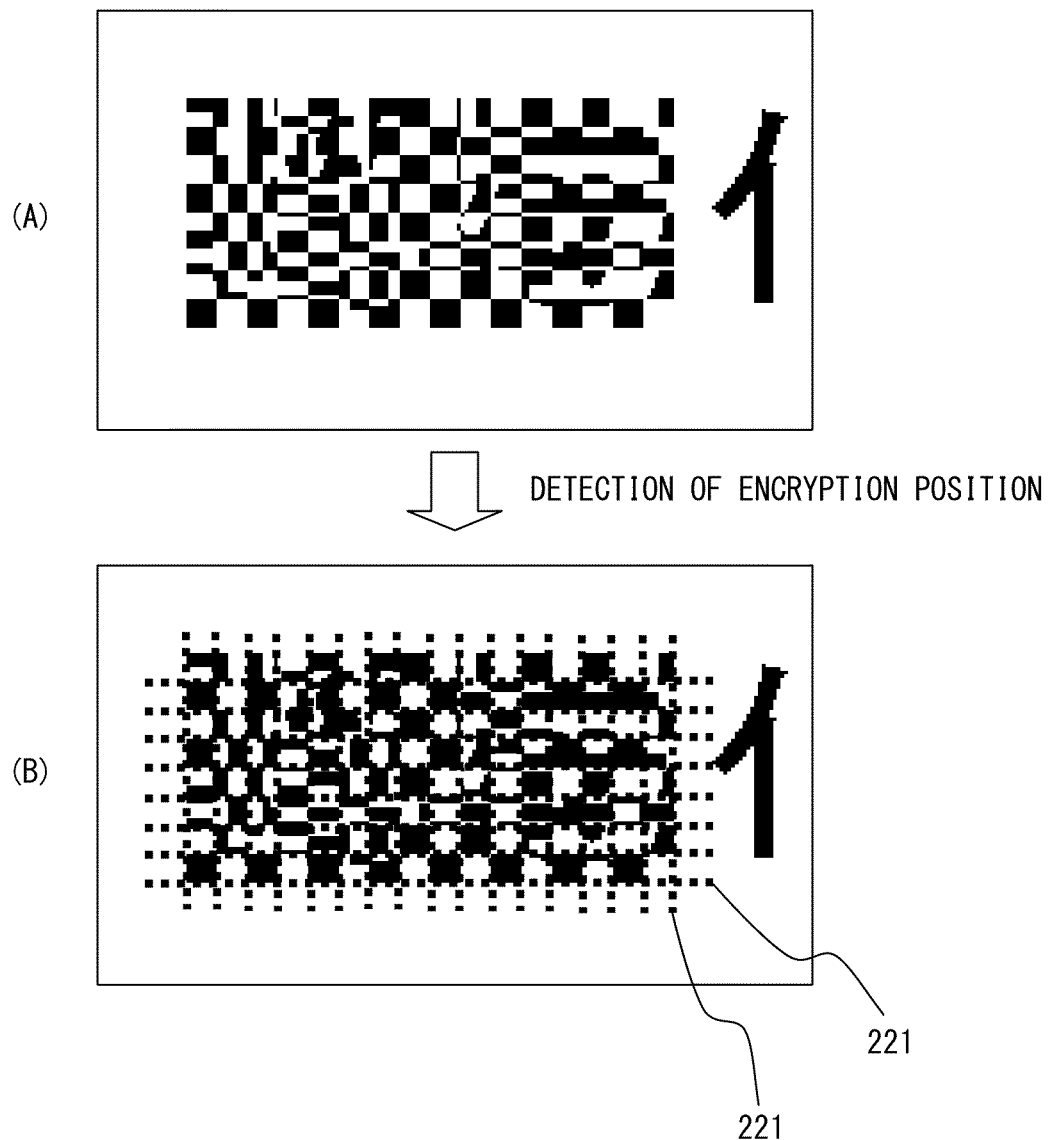
F I G. 2 4

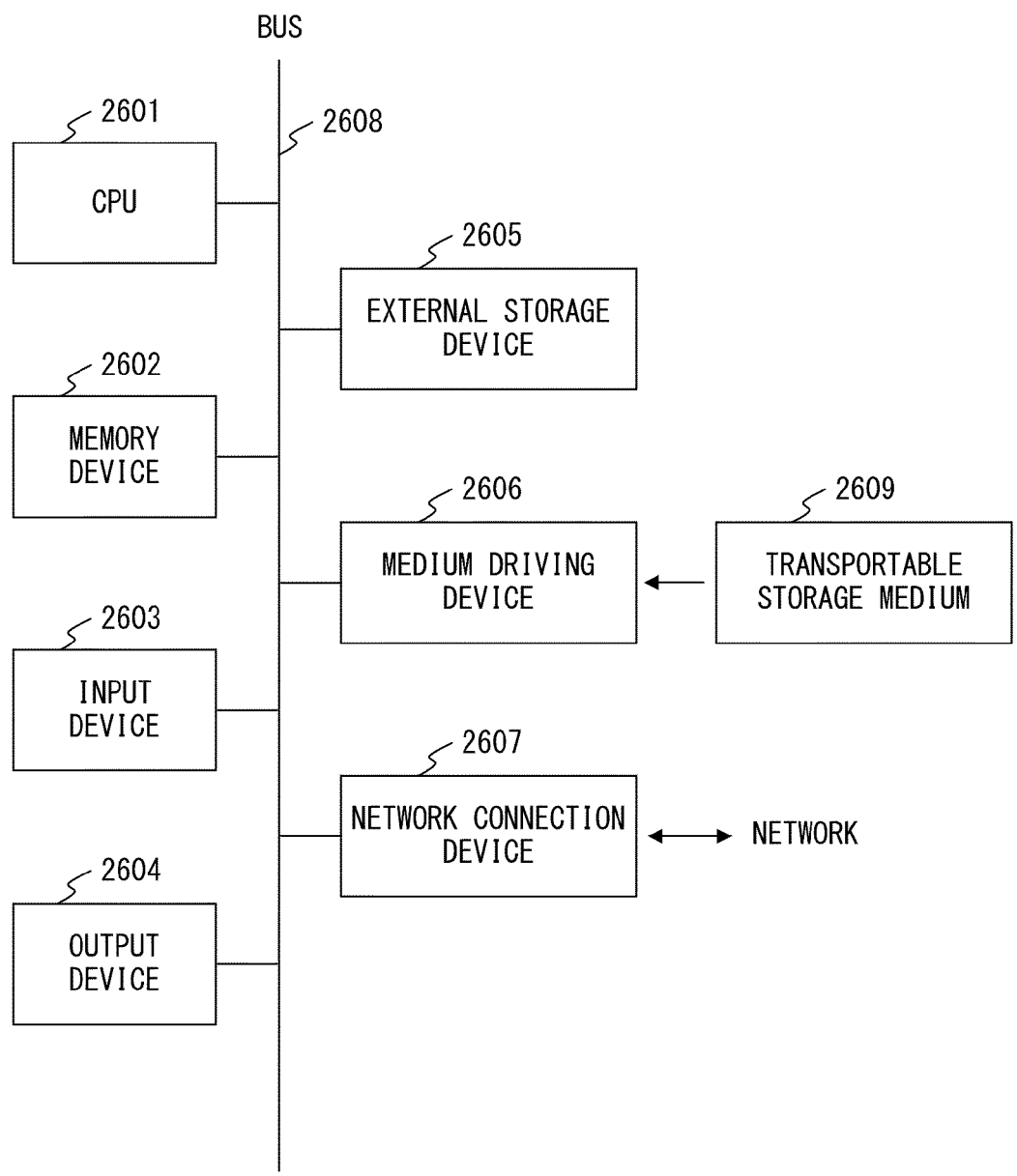
F I G. 2 8

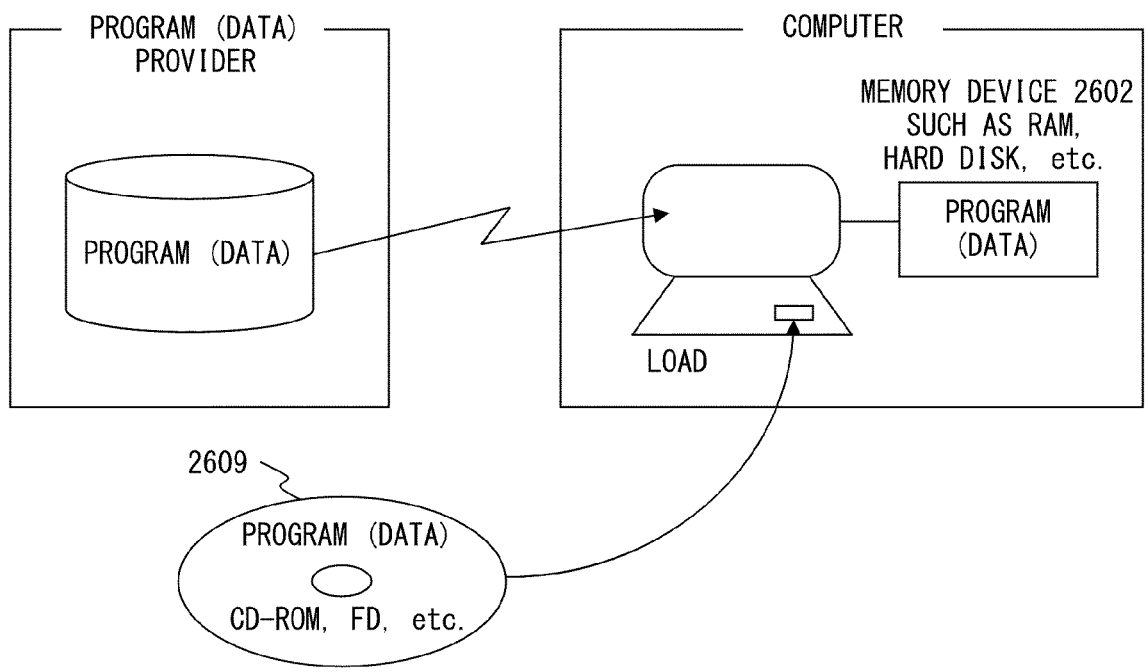
F I G. 29

DEVICE, METHOD, AND PROGRAM FOR IMAGE ENCRYPTION/DECRYPTION

CROSS REFERENCE TO RELATED APPLICATIONS

This application is a continuing application, filed under 35 U.S.C. § 111(a), of PCT International Application PCT/JP2007/000215 filed Mar. 13, 2007, which claimed priority to PCT International Application PCT/JP2006/321794 filed Oct. 31, 2006, the contents of both of which are incorporated herein by reference.

FIELD

The invention discussed herein is related to an image encryption and decryption technique that visually encrypts a particular part such as an important part of an image on a printed material or of a digital image in order to prevent a leakage of information to a third party.

BACKGROUND

As the informatization of society has progressed, problems involving leakage of confidential information have become more serious, increasing demand for the development of a technique of preventing information leakage. For digital data, for example, techniques of encrypting data in order to prevent the content of the data from being looked at by a third party even when the third party has obtained the data have actually been developed and used as an effective countermeasure against information leakage.

However, no technique of preventing leakage of information of printed material such as paper media has been developed sufficiently, and therefore there has been no success in the practical use of such a technique. About fifty percent of information leakage are said to be made through printed material, and accordingly not only a technique of preventing information leakage through digital data but also the development of a technique of preventing information leakage through printed material is considered a pressing urgency.

Specific examples for which countermeasures against information leakage through printed material are desired include bills for product purchases, account statements for credit cards and the like, medical records, school grade reports, rosters, and the like. The present invention can be applied as a technique of encrypting, for example, the important parts of the above forms of information in order to prevent information leakage.

Japanese Laid-open Patent Publication No. 8-179689 (Patent Document 1) is an example of a disclosure of a technique of encrypting information on printed material. In the technique disclosed in Patent Document 1, an entire image is first divided into plural blocks, the images in the blocks are rearranged on the basis of parameters obtained from the input password (encryption key), and a black-and-white inversion process and a mirror inversion process are performed on the images in the blocks specified by the parameters in order to encrypt the image. When the encrypted image is to be decrypted, a positioning frame is set on a portion outside of the image, the password (decryption key) is input, and the original image is restored by executing in reverse order the steps executed for the encryption.

As another example of a conventional technique, there is a technique in which binary data in the form of images is embedded in printed material as disclosed in Japanese Patent No. 2938338 (Patent Document 2). In this conventional technique, binary data is converted into images by expressing binary data in the form of black or white rectangles and arranging them in a matrix. Further, the printed material has positioning symbols set at specified positions on the matrix in order to indicate the position of the embedded image for the decryption. Reference to these positioning symbols makes it possible to photograph the image with a digital camera or the like and decrypt the embedded information.

SUMMARY

However, the above conventional techniques have problems as described below.

For example, the technique disclosed in Patent Document 1 can only encrypt an entire image, preventing efficient encryption when only a small part of an image needs to be encrypted.

Further, the technique disclosed in Patent Document 1 requires a positioning frame to be set around the encrypted image, and the image information in the place of the frame may prove to be unusable when the image is to be encrypted.

Also, the technique disclosed in Patent Document 1 does not take into consideration the deformation that can occur in an image, resulting in being unable to precisely extract block units of scrambling when the image becomes large.

The present invention can encrypt a part of an image and generates, by the pixel value conversion process performed on the input image, an alternative of the "positioning frame" used in the technique disclosed in Patent Document 1, minimizing information loss in the input image. Further, the present invention can easily detect the scramble block unit.

Also, even though the technique disclosed in Patent document 2 can embed data using relatively small amounts of information such as text information, it is not appropriate for a case where data using a large amount of information (such as image information or audio information) is to be stored and decryption errors can be absorbed to some extent. Further, this technique requires the images to be square and of a particular size, and cannot be applied to applications in which a portion of a character needs to be concealed.

Further, the technique in patent document 2 is based on the assumption that the characters and figures are printed in black and white, and cannot be applied to applications in which the images are photographs or the like in which the images are in multiple tones.

The present invention can encrypt image data in such a manner that the encrypted data is invisible to human eyes even when the image data uses a large amount of information and accordingly cannot be encrypted by the technique in patent document 2.

In order to encrypt a portion of an input image in such a manner that the encrypted area can be located when the encrypted part is to be decrypted, the present invention uses the three types of means described below.

The first means is means for regularly converting pixel values in an encrypted area in order to generate a pattern unique to the pixel value conversion.

The second means is means for setting positioning markers, being used for locating encryption positions, at two or more of the four corners of the encrypted area.

The third means is means for setting at least one checking mark, being used for verifying the appropriateness of the decrypted image, in the area to be encrypted before an encryption process starts.

Using the above three types of means, the present invention can accurately locate an encrypted area when decrypting the input image even if the encrypted area is only a part of the input image, and thereby can restore the original image in such a manner that the restored image can be recognized by human eyes.

According to an aspect of the present invention, image encryption performed in an image encryption device that encrypts a digital image into an encrypted image includes: specifying a partial area to be encrypted in the digital image; converting the selected partial area into a processed image on the basis of an encryption key; and generating a converted image by regularly converting pixel values of the processed image obtained through the conversion so that a position of the partial area can be located.

In the conversion into the processed image, it is desirable that the partial area be divided into a plurality of micro areas and that the plurality of divisional micro areas be rearranged on the basis of the encryption key, or that the partial area be converted into compressed data using an arbitrary compression method, and that each of the bits of the converted compressed data be arranged as a white pixel or a black pixel of an arbitrary size.

In the conversion into the converted image, it is also desirable that the pixel values in horizontal and vertical directions in the processed image be converted in a constant cycle, and that a converted image approximately representing a checkerboard pattern be generated.

It is also desirable that a specified marker be set in the generated converted image, and thereby that the encrypted image be generated in order to locate a position of the partial area.

It is also desirable that the marker be a circle or a polygon that is drawn with a solid line and that contains a plurality of lines crossing the circumference of the circle or the polygon, or that a foreground of the marker be formed by a pixel value conversion.

Also, according to another aspect of the present invention, image decryption performed in an image decryption device that decrypts an encrypted image into a digital image includes: detecting a specified marker set in the encrypted image in order to locate a position of a partial area that was encrypted; detecting an encrypted image area on the basis of the detected marker; detecting an encryption position around which pixel values are converted regularly in the detected encrypted image area; and decrypting the encrypted image area into the digital image on the basis of the detected encryption position and a decryption key.

Also, according to another aspect of the present invention, image decryption performed in an image decryption device that decrypts an encrypted image into a digital image includes: detecting an encrypted image area; detecting an encryption position around which pixel values are converted regularly in the detected encrypted image area; decrypting the encrypted image area into the digital image on the basis of the detected encryption position and a decryption key; and detecting a specified checking mark for verifying appropriateness of decryption on the basis of the digital image obtained by decryption.

Also, according to another aspect of the present invention, image decryption performed in an image decryption device that decrypts an encrypted image into a digital image includes: detecting a specified marker set in the encrypted image in order to locate a position of a partial area that was encrypted; detecting an encrypted image area on the basis of the detected marker; detecting an encryption position around which pixel values are converted regularly in the detected encrypted image area; decrypting the encrypted image area into the digital image on the basis of the detected encryption position and a decryption key; and detecting a specified checking mark for verifying appropriateness of decryption on the basis of the digital image obtained by decryption.

The present invention uses means for regularly converting pixel values in an encrypted area and generating a pattern unique to the pixel value conversion in order to solve the problem of the technique of Patent Document 1 in which a positioning frame set around the encrypted image causes the loss of image information. When the encrypted area includes subjects having edges (such as characters, etc), the pattern of the encrypted image obtained by this process is not complete; however, the utilization of the statistical characteristic of the entire encrypted image enables correct detection of the encrypted position.

Further, regular patterns generated by the conversion of pixel values for the detection of the encryption position used in an encryption process in the present invention have a substantial width, enabling correct detection of the encryption position even when the encrypted image is read with a camera of low resolution to decrypt the image. Using also a method in which images are compressed to be encrypted can produce a decrypted image whose quality does not depend upon the resolution of a camera or a scanner.

BRIEF DESCRIPTION OF DRAWINGS

FIG. 2 is a diagram illustrating the outline of a process of an embodiment (second);

FIG. 4 illustrates an example of selecting an area to be encrypted;

FIG. 8 illustrates a variation example of the shapes of micro areas in a scrambling process;

FIG. 13 illustrates examples of positioning markers used in the encrypting process;

FIG. 15 illustrates an example of encryption of a gray-scale image;

FIG. 17 illustrates a process of detecting an encrypted area from the positioning markers;

FIG. 24 illustrates a method of detecting encryption positions (horizontal directions);

FIG. 28 illustrates a configuration of a processing device that executes the encryption process and the decryption process according to the present invention; and FIG. 29 illustrates loading of the encryption and decryption programs according to the present invention onto a computer.

DESCRIPTION OF EMBODIMENTS

Hereinafter, the embodiments of the present invention will be explained with reference to the accompanying drawings.

First, an encryption process and a decryption process in the first through third embodiments will be explained by referring to FIGS. 1 and 2.

Figure 1:
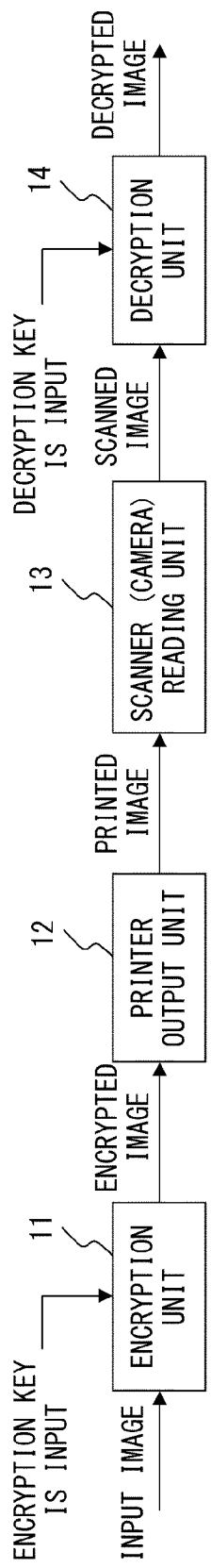
FIG. 1 is a diagram illustrating the outline of a process of an embodiment (first)

FIG. 1 is a diagram illustrating the outline of a process of an embodiment (first).

In FIG. 1, an encryption unit 11 (this is referred to as an encryption unit 11A, 11B, or 11C in the first through third embodiments respectively) encrypts a portion of an input digital image on the basis of the input digital image and an encryption key, and outputs the encrypted image. A printer output unit 12 prints the digital image encrypted by the encryption unit 11 on a printable physical medium such as paper or the like. A scanner (camera) reading unit 13 uses a scanner or a camera to read the printed image output from the printer output unit 12.

Thereafter, a decryption unit 14 (referred to as decryption units 14A, 14B, and 14C in the first through third embodiments respectively) obtains a decrypted image on the basis of the printed image output from the printer output unit 12 and the input decryption key. Only when the input decryption key is correct can the encrypted image be decrypted correctly so that the information concealed by the encryption performed by the encryption unit 11 is made recognizable.

FIG. 2 is a diagram illustrating the outline of a process of an embodiment (second).

As illustrated in FIG. 2, in an encryption process and a decryption process in the first through third embodiments, it is also possible to input to the decryption unit 14 a digital image decrypted by the encryption unit 11 without processing it with a scanner or a printer (i.e., as an electronic document image) in order to obtain the decrypted image.

Next, the first through third embodiments will be explained respectively.

First, the first embodiment will be explained.

Figure 3:
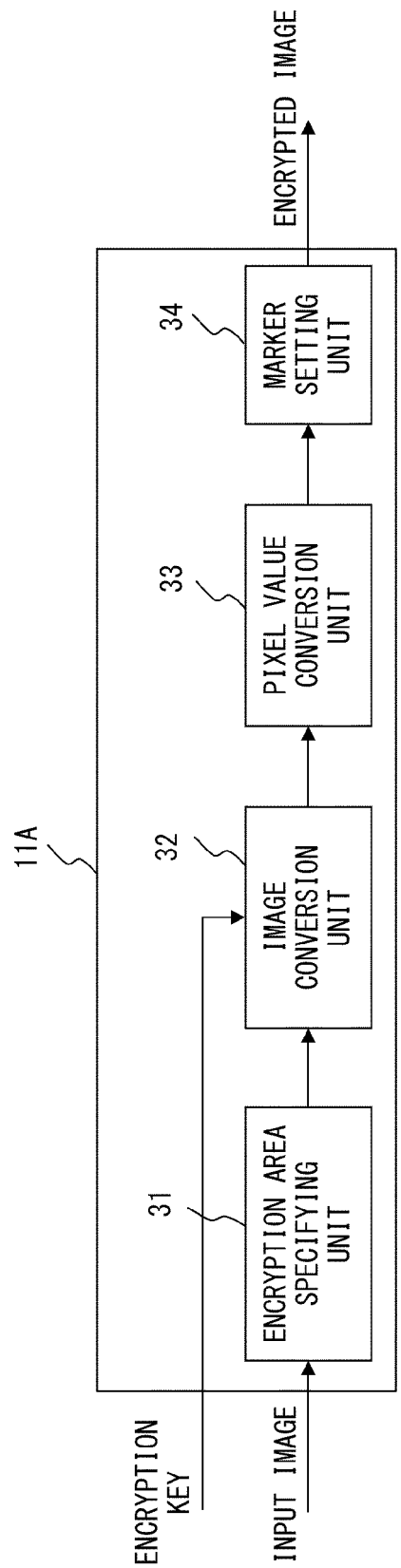
FIG. 3 illustrates the outline of an encryption process in the first embodiment.

FIG. 3 illustrates the outline of an encryption process in the first embodiment.

In FIG. 3, the encryption unit 11A includes an encryption area specifying unit 31, an image conversion unit 32, a pixel value conversion unit 33, and a marker setting unit 34.

The encryption area specifying unit 31 selects an area to be encrypted on an input image including an area to be encrypted.

FIG. 4 illustrates an example of selecting an area to be encrypted.

The encryption area specifying unit 31, as indicated by (A) in FIG. 4, selects an area 42 to be encrypted in a digital image (input image) 41 including an area to be encrypted. The area 42 is converted through various processes by an image conversion unit 32 and a pixel value conversion unit 33 into a converted image 43 as indicated by (B) in FIG. 4. Thereby, the digital image 41 is converted into an encrypted image 44 including the converted image 43.

FIG. 3 is explained again.

When the encryption area specifying unit 31 has selected the area 42 to be encrypted, the area 42 and the encryption key are input into the image conversion unit 32, and the image of the area 42 is visually converted using the conversion method corresponding to the encryption key. The parameters for this conversion are generated from the binary data obtained from the input encryption key.

Figure 5:
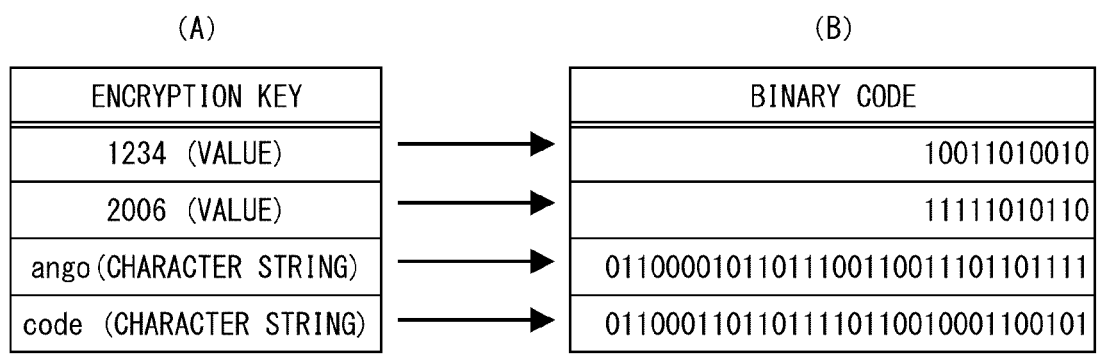
FIG. 5 illustrates an example of inputting of an encryption key.

FIG. 5 illustrates an example of inputting of an encryption key.

The example illustrated in FIG. 5 is an example of an encryption key and the binary data generated from the encryption key. For example, the value "1234" is input in the form of binary data "10001101010", and the character string "ango" as the encryption key is input in the form of binary data "01100001011011100110011101101111".

As conversion methods used in the first embodiment, two methods will be described. One is a conversion method based on a process of dividing an image into micro areas to rearrange them (a scrambling process), and the other is a conversion method based on compression of an image.

First, a scrambling process will be explained.

In a scrambling process, the selected area 42 is first divided into micro areas of a prescribed size, and the micro areas are rearranged in accordance with the binary data obtained from the encryption key.

Figure 6:
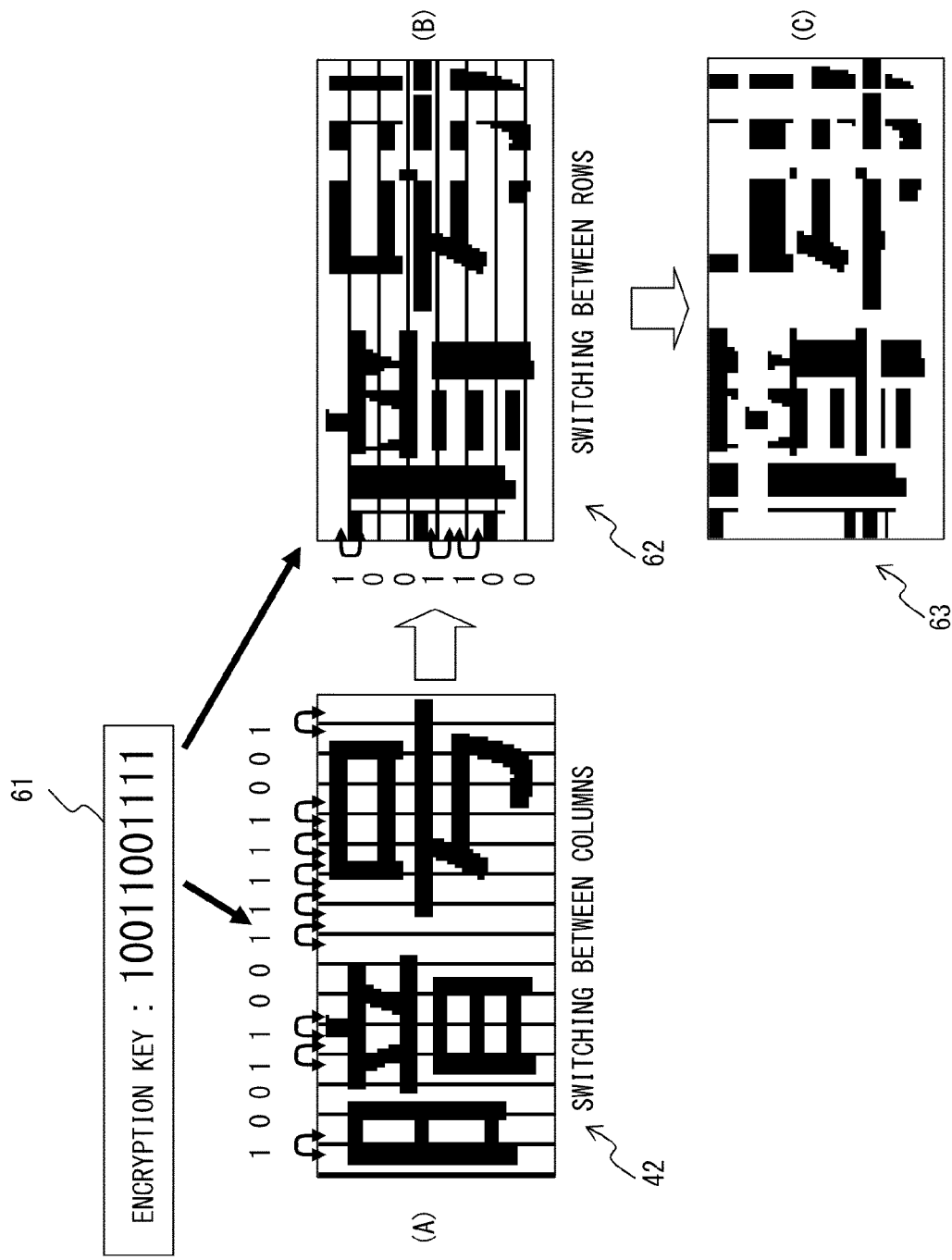
FIG. 6 illustrates an example of a scrambling process by an image conversion unit.

FIG. 6 illustrates an example of a scrambling process in the image conversion unit.

As indicated by (A) in FIG. 6, the area 42 selected by the encryption area specifying unit 31 is first divided in such a manner that the image is cut in the vertical direction, and the bits in the binary string of an encryption key 61 are respectively made to correspond to the boundaries in the area 42 starting from left-side. Then, a process is repeatedly executed from the left-side in which two adjacent columns are switched with each other when their boundary has the bit "1", and they are not switched when their boundary has the bit "0". When there are not as many bits in the binary string as the number of boundaries, the same bits in the binary string are repeatedly used to reach the right-side end of the area 42.

Next, as indicated by (B) in FIG. 6, an image area 62 which is obtained by performing the process of a switching column is divided in such a manner that the image is cut in the horizontal direction. The bits in the binary string of the encryption key 61 are respectively made to correspond to the boundaries on the image area 62, and a switching process similar to the process performed on the vertically divided image is performed sequentially from the top.

By performing the above switching processes on the above divided images, a scrambled image 63 in which the scrambling process has been performed on the original area 42 is obtained as indicated by (C) in FIG. 6.

This scrambling process may be performed two or more times each for the vertical and horizontal directions. Also, the switching in the second or subsequent scrambling processes may be performed with divisional areas having different sizes. Further, a different binary string may be used for the switching of the divisional areas in the vertical and horizontal directions. These methods are particularly effective in preventing the generation of a completely identical image from different encryption keys when the input image is small and the bit length of the encryption key is great.

Figure 7:
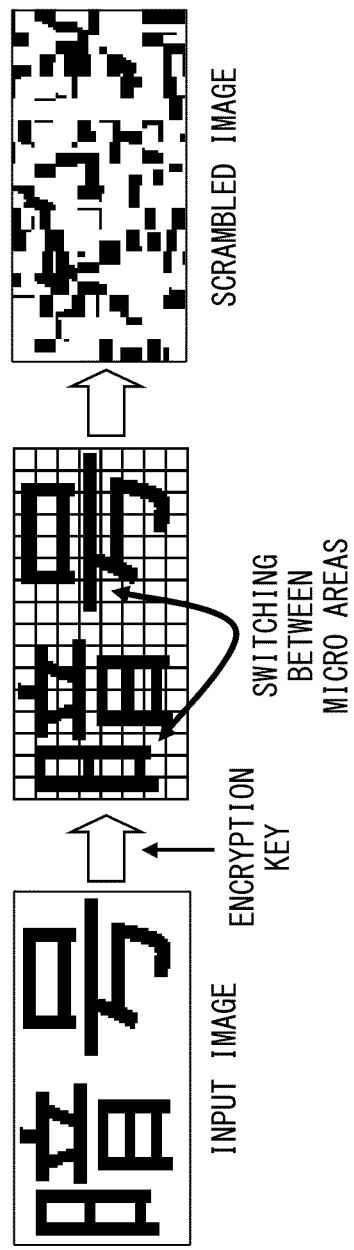
FIG. 7 illustrates another example of a scrambling process by the image conversion unit.

FIG. 7 illustrates another example of a scrambling process by the image conversion unit.

Besides the scrambling process illustrated in FIG. 6, a method in which the pixels are switched in units of the micro areas illustrated in FIG. 7 may be used as another form of a scrambling process. Specifically, the input image is divided into micro areas that are rectangular, and these micro areas are switched with each other. Thereby, the number of outcomes of a scrambling process becomes larger than the above method in which switching is performed in the vertical and horizontal directions (columns and rows), increasing the encryption strength.

FIG. 8 illustrates a variation example of the shapes of the micro areas in a scrambling process.

In a scrambling process, besides the rectangular micro areas illustrated in FIG. 7, triangular micro areas can be used, for example as indicated by (A) in FIG. 8. Also, micro areas that are different in size and shape can be used together as indicated by (B) in FIG. 8.

Next, a conversion method based on compressing an image will be explained.

Figure 9:
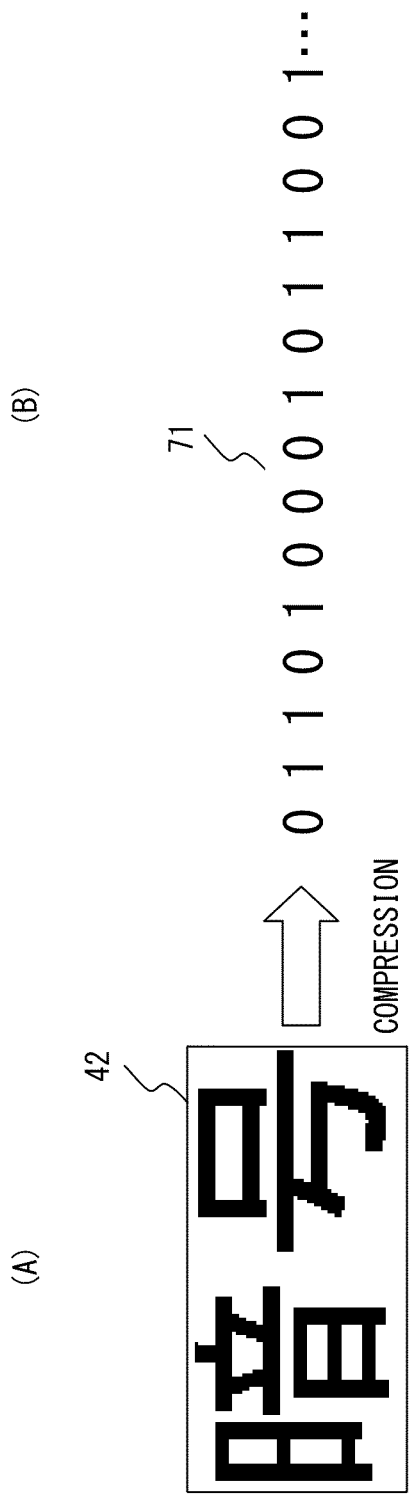
FIG. 9 illustrates a compression process by the image conversion unit.

FIG. 9 illustrates a compression process by the image conversion unit.

When the digital image 41 is a binary image, the area 42 selected by the encryption area specifying unit 31 is compressed as indicated by (A) in FIG. 9 in order to generate a binary string 71 as indicated by (B) in FIG. 9. A very wide range of compression methods—including the run-length method, which is used for the binary image data transmission through facsimile communications, and JBIG (Joint Bi-level Image experts Group) compression, which is a standard compression method for binary images—can be applied to this compression.

Figure 10:
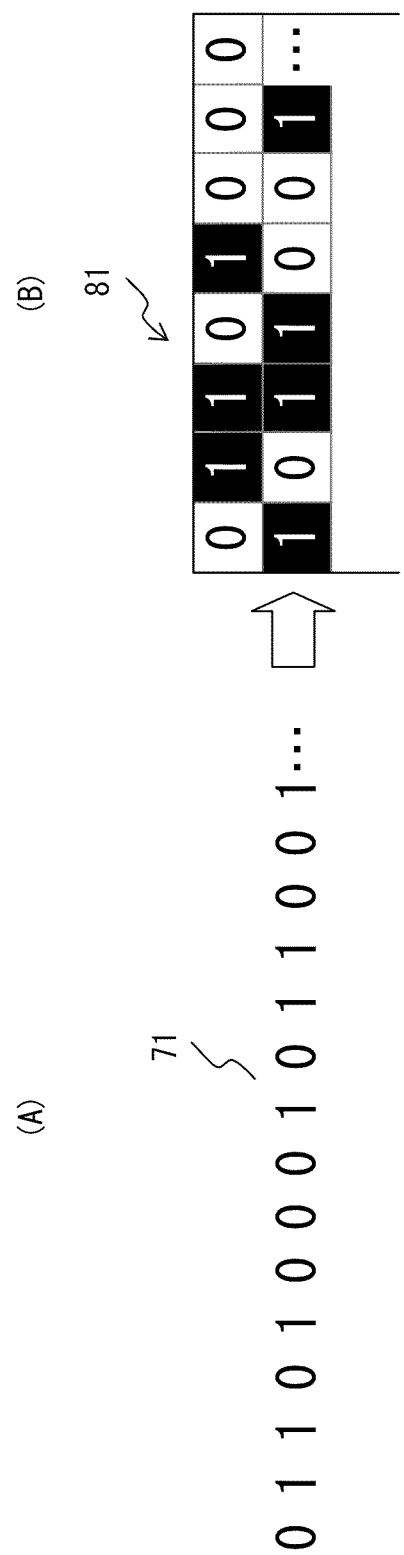
FIG. 10 illustrates a process of changing the converted data into images.

FIG. 10 illustrates a process of changing the converted data into images.

After the compression of the area 42 as illustrated in FIG. 9, rectangular images (processed image) 81 in a prescribed size are generated. The colors of the rectangles are white and black respectively when the bits in the binary string 71 are "0" and "1", as indicated by (B) in FIG. 10. These rectangles are arranged in the area 42 to be encrypted.

When it is desired to be arrange the converted compression data (binary string 71) within the selected area 42, the size of the rectangular images 81 should depend upon the compression ratio of the selected area 42. For example, when the compression ratio is equal to or lower than 1/4, the size of the rectangular images 81 is at most 2×2, and when the compression ratio is equal to or lower than 1/16, the size is at most 4×4.

When it is desirable that the size of the rectangular images 81 be specified beforehand and the compression data be within the selected area 42, the first image compression process has to be performed at a compression ratio that depends upon the size of the rectangular images 81. For example, when the size of the rectangular images 81 is to be 16 (4×4) pixels, a compression ratio of at least 1/16 is required. In such a case, a method in which information on the selected area 42 is reduced beforehand or lossy compression methods are effective.

The above encryption process in which the compression data is expanded in order to generate images makes it possible to recognize black and white blocks even when the encrypted image has been read with, for example, a camera of low resolution, enabling correct decryption of the encrypted image.

FIG. 3 is explained again.

The pixel value conversion unit 33 converts, at constant intervals, the pixels in the scrambled image 63 converted by the image conversion unit 32 so that the converted image 43 approximately represents a checkerboard pattern.

Figure 11:
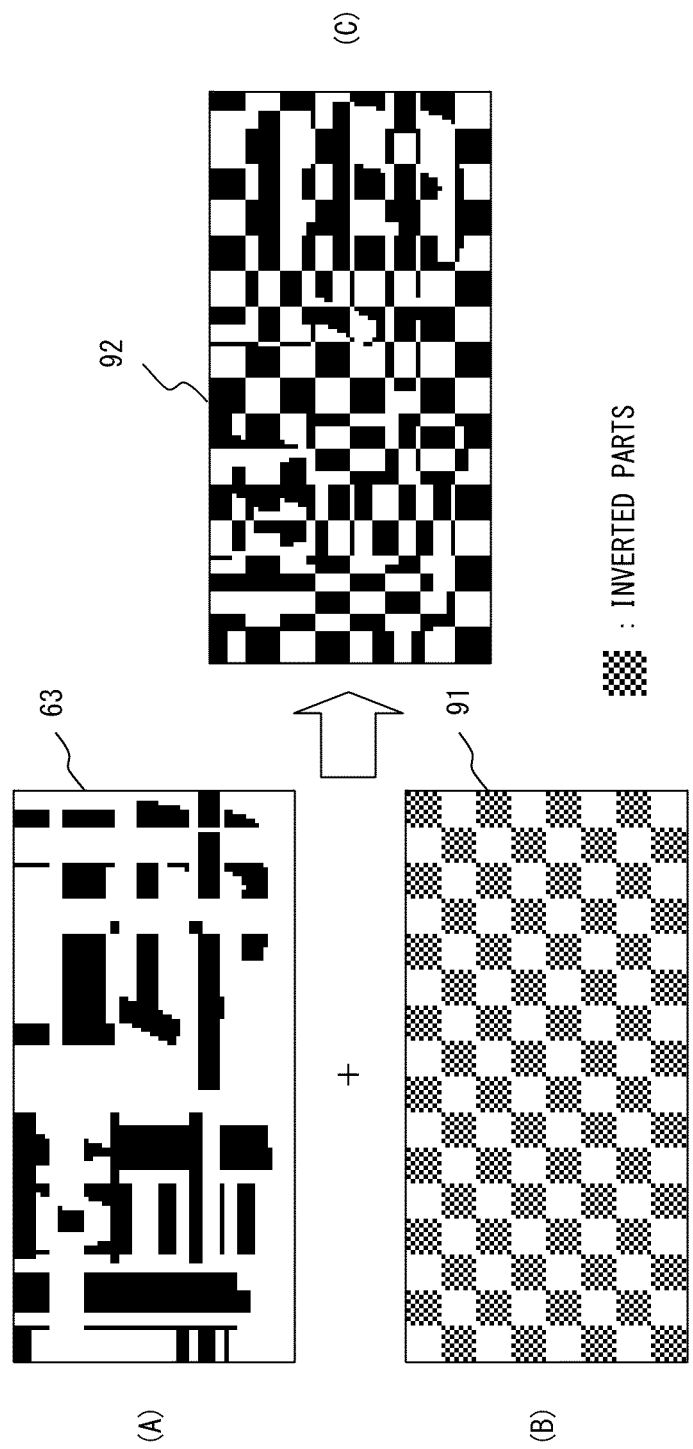
FIG. 11 illustrates an example of a pixel value conversion process by the pixel value conversion unit (first)

FIG. 11 illustrates an example of a pixel value conversion process by the pixel value conversion unit (first).

The pixel value conversion unit 33 converts, at regular intervals, the pixels in the scrambled image 63 in which the area 42 has been scrambled by the image conversion unit 32 so that the entire encrypted image 44 approximately represents a checkerboard pattern. As illustrated in, for example, FIG. 11, performing of a conversion by which the parts in the scrambled image 63 ((A) in FIG. 11) corresponding to the colored parts in a checkerboard image 91 ((B) in FIG. 11) are inverted can generate a converted image 92 ((C) in FIG. 11) in such a manner that the encrypted image 44 approximately represents a checkerboard pattern. The generated checkerboard pattern is used for detecting the detailed position of each of the pixels in the encrypted area when the encrypted image 44 is decrypted.

For the above series of processes, another method of conversion may be used. For example, the process of inverting the pixels may be implemented by adding a prescribed value.

The checkerboard image 91 indicated by (B) in FIG. 11 is of substantially the same size as the scrambled image 63 indicated by (A) in FIG. 11; however, it is also possible to use a checkerboard image 91 of a size smaller than that of the scrambled image 63 so that only the central portion of the scrambled image 63 is inverted.

Figure 12:
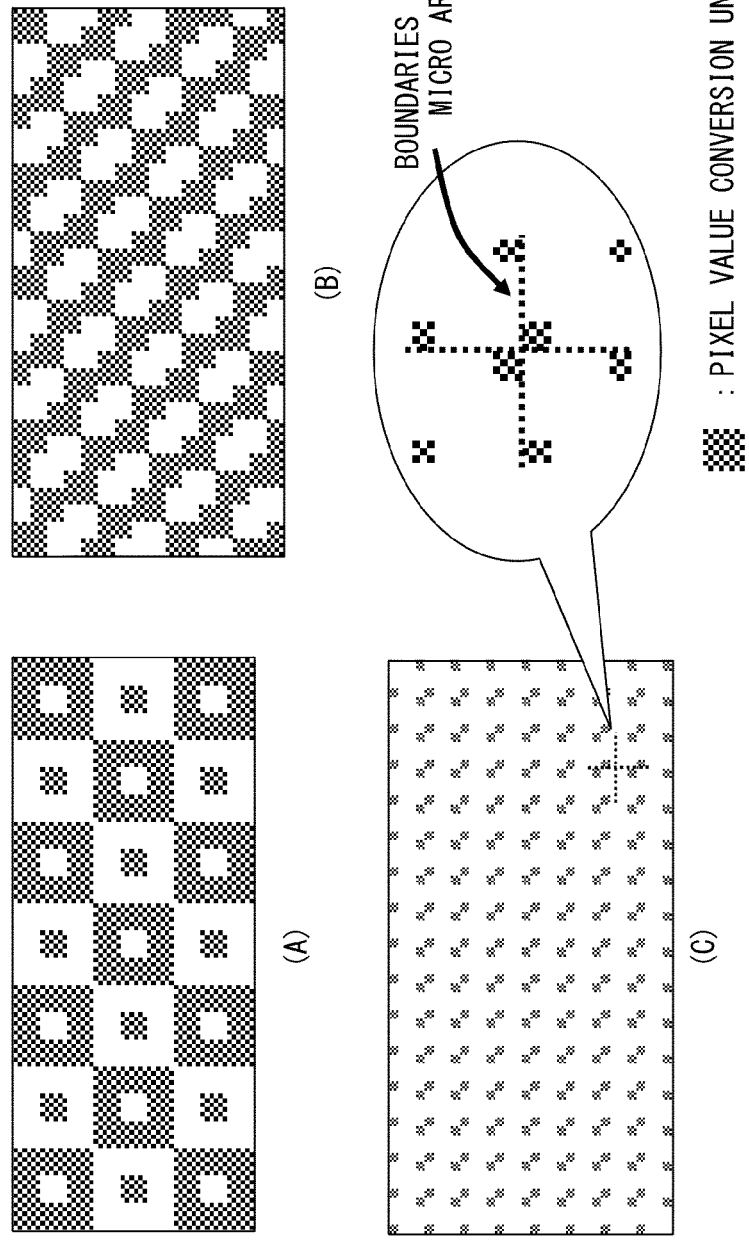
FIG. 12 illustrates an example of a pixel value conversion process by the pixel value conversion unit (second)

FIG. 12 illustrates an example of a pixel value conversion process by the pixel value conversion unit (second).

It is also possible to employ various shapes, as indicated by (A) through (C) in FIG. 12, for the area 42 in which pixel values are to be converted. Because the pixel value conversion is a process for allowing precise detection of positions of boundaries between micro areas, the pixel value conversion may be performed only on the boundary portions as indicated by, for example, (A) in FIG. 12. Also, when the pixel value conversion is performed while shifting the conversion target of the micro areas little by little as indicated by (B) in FIG. 12, the boundaries between the converted areas and non-converted areas appear at shorter intervals, enabling more detailed detection of the pixel positions in the encrypted image 44 when the decryption process is performed. Further, performing of the pixel value conversion only on the intersections of the boundaries between the micro areas as indicated by (C) in FIG. 12 can minimize deteriorations in image quality when the image printed on paper or the like is read by a scanner or a camera to be decrypted.

It is also possible to perform a pixel value conversion in units of divisional areas shaped differently from the micro areas (for example, a pixel value conversion in units of areas obtained by dividing the image into triangles).

Further, a pixel value conversion according to the shapes of micro areas (for example a pixel value conversion for triangles when the micro areas are triangles) may be performed when the micro areas are not rectangles of a consistent size, but are triangles ((A) in FIG. 8) or are different from each other in size and shape ((B) in FIG. 8). Also, a pixel value conversion that disregards the shapes for scrambling (for example, a pixel value conversion for rectangles when the micro areas are triangles) may be performed.

As described above, in this invention, a regular pattern indicating the encryption positions is generated by converting the pixel values in an input image instead of overwriting the input image as in Patent Document 1. Accordingly, image information along the edges of an encrypted image is not made unusable for the position detection, which is different from the conventional techniques. Thereby, position detection information can exist together with the original image information, improving the efficiency of encryption.

When image information is included in one of the portions that constitute the pattern, the regularity of the pattern is lost to some extent. However, the encryption positions can be detected by utilizing the statistical characteristic of the entire encrypted image, as will be described regarding a process by the decryption unit 14.

FIG. 3 is explained again.

The marker setting unit 34 sets positioning markers at three of four corners of the converted image 92 converted by the pixel value conversion unit 33, i.e., at all except for one corner, such as the bottom right corner, in order to generate the encrypted image 44.

The marker setting unit 34 sets, at three of four corners of the converted image 92, i.e., at all except for one corner, such as the bottom right corner, the positioning markers for locating the position of the encrypted area 42.

FIG. 13 illustrates examples of positioning markers used in the encrypting process.

A positioning marker used in this first embodiment is assumed to be a cross enclosed by a circle as indicated by (A) in FIG. 13. Any figure consisting of a circle or a polygon drawn with a solid line and a plurality of lines crossing or contacting the circumference of the circle or polygon may be used as a positioning marker. Examples of these figures are a box having a cross in it ((B) in FIG. 13), a circle in which three lines radially extend from the center ((C) in FIG. 13), and a circle in which lines are cut ((D) in FIG. 13).

Also, positioning markers may be configured to have a white background and a black foreground as the simplest configuration. However, different configurations according to the distributions of the colors (pixel values) in the converted image 92 may be employed. It is also possible to invert the pixel values of the foreground without changing the color of the background in the digital image 41 in order to form positioning markers instead of specifying particular colors for the background and foreground. This makes it possible to encrypt images while the input image information overlapped by the positioning markers is maintained.

Figure 14:
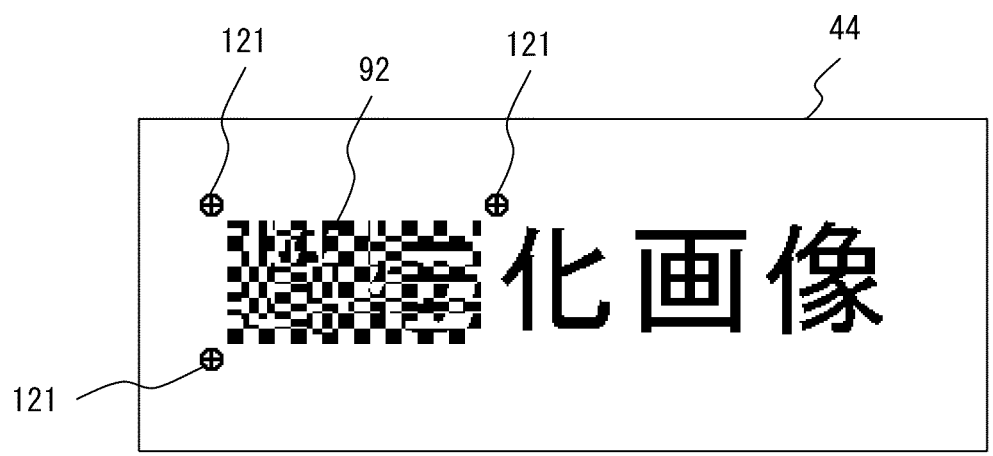
FIG. 14 illustrates an example of an encrypted image.

FIG. 14 illustrates an example of an encrypted image.

The process by the encryption unit 11A described above generates the encrypted image 44 as illustrated in FIG. 44. The encrypted image 44 includes the converted image 92 and positioning markers 121.

When the image conversion unit 32 performs "rearrangement of micro areas (a scrambling process)" in the encryption method in the first embodiment, the encryption method can be applied not only to binary images but also to gray-scale images or color images.

FIG. 15 illustrates an example of encryption of a gray-scale image.

In FIG. 15, a gray-scale image 131 indicated by (A) undergoes a process by the encryption unit 11A, and an encrypted image 132 including positioning markers 134 and a converted image 133 is generated as indicated by (B).

Next, decryption unit 14A will be explained.

Figure 16:
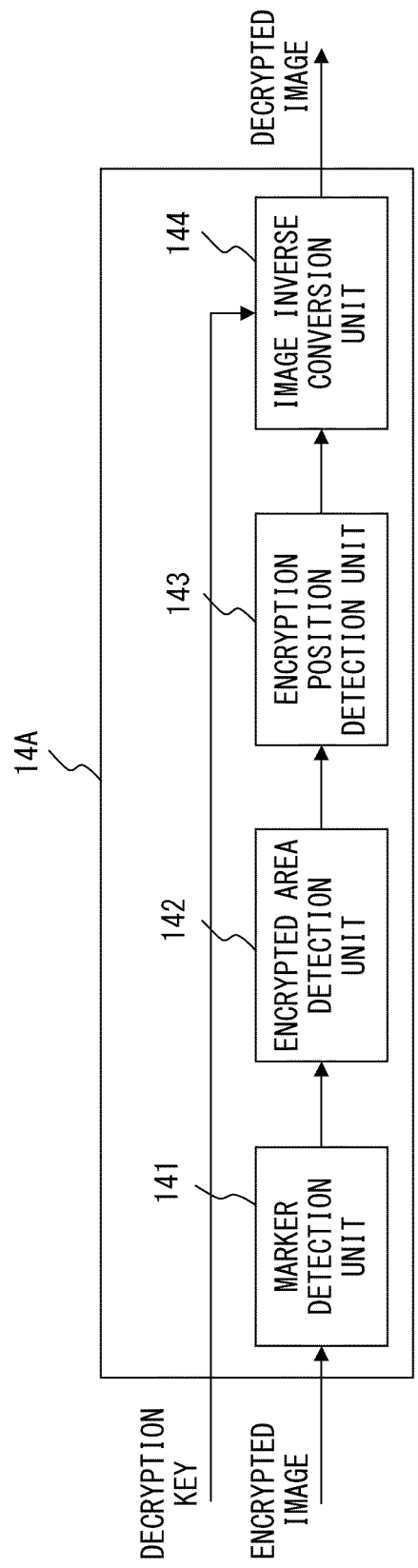
FIG. 16 illustrates the outline of a decryption process in the first embodiment.

FIG. 16 illustrates the outline of a decryption process in the first embodiment.

In FIG. 16, the decryption unit 14A includes a marker detection unit 141, an encrypted area detection unit 142, an encryption position detection unit 143, and an image inverse conversion unit 144.

The marker detection unit 141 uses a conventional image recognition technique to detect on the encrypted image the positions of the positioning markers set by the marker setting unit 34. As a detection method, a pattern matching method or an analysis of the connectivities of figures can be used.

The encrypted area detection unit 142 detects the position of the area of the encrypted image on the basis of the positional relationship among the three positioning markers detected by the marker detection unit 141.

FIG. 17 illustrates a process of detecting the encrypted area from the positioning markers.

As indicated by (A) in FIG. 17, when at least three positioning markers 152 have been detected by the marker detection unit 141 on an encrypted image 151, an encrypted area 153 can be detected as indicated by (B). The three positioning markers 152 are set at the corners of the rectangular encrypted area 153, and accordingly the lines connecting these three points (positions of the positioning markers 152) form an almost right triangle. Thus, when at least three positioning markers 152 have been detected, a rectangle which includes an area of an almost right triangle formed by the three positioning markers 152 and three of the four corners of which correspond to the positions of the positioning markers 152 is handled as an encrypted area 153. When only two or fewer positioning markers 152 have been detected, the encrypted area 153 cannot be located, and accordingly it is determined that an encrypted image does not exist, and the decryption process is terminated.

Figure 18:
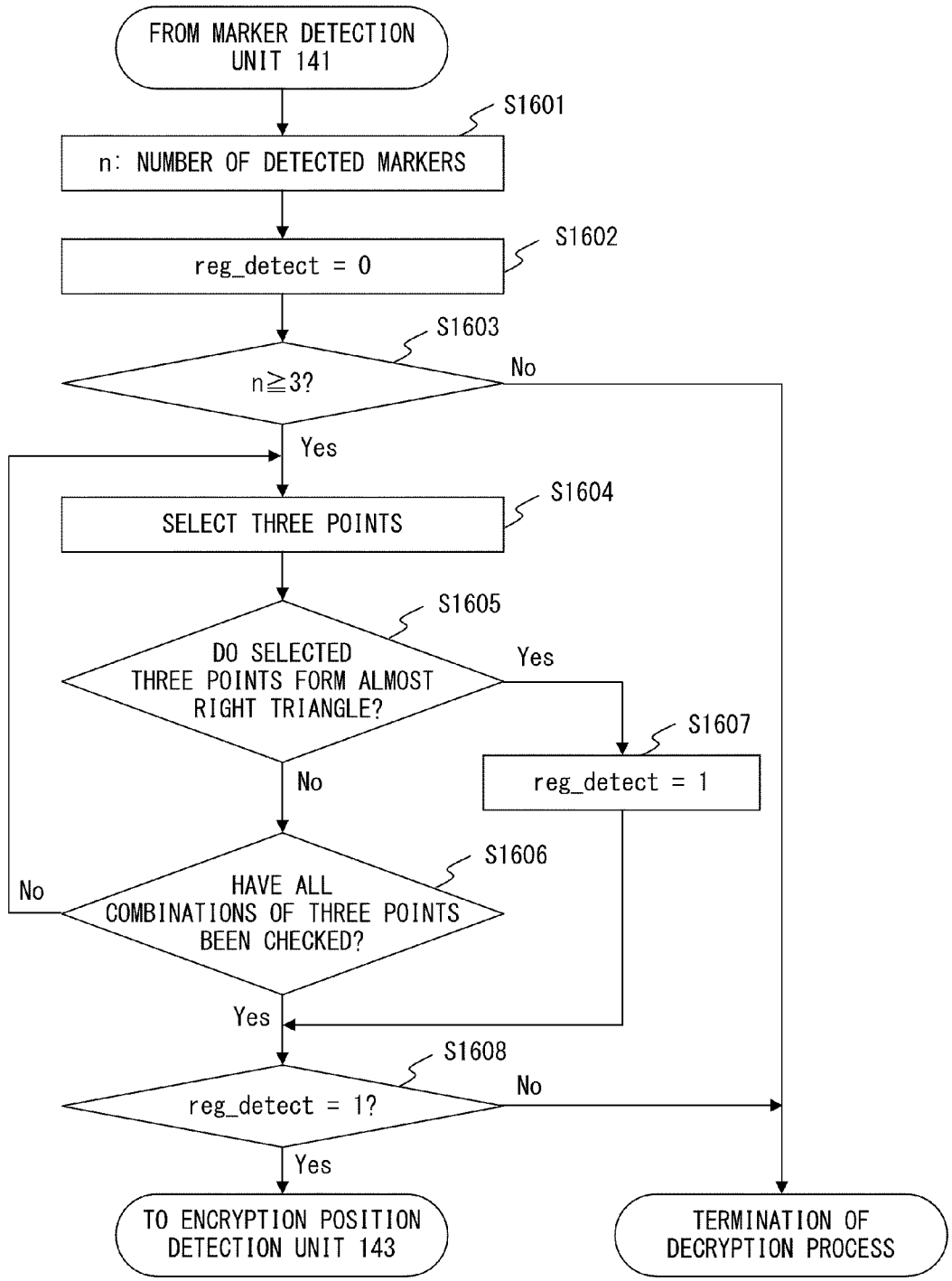
FIG. 18 is a flowchart illustrating the flow of the encrypted area detection process.

FIG. 18 is a flowchart illustrating the flow of the encrypted area detection process.

In the encrypted area detection process performed by the encrypted area detection unit 142, the number of the positioning markers 152 detected by the marker detection unit 141 is assigned to a variable n in step S1601, and 0 is assigned to a detection flag reg_detect used for detecting the encrypted area 153 in step S1602.

In step S1603, it is determined whether or not the variable n to which the number of the positioning markers 152 has been assigned is equal to or greater than 3, and when the variable is not equal to or greater than 3 (No in step S1603), the decryption process including this encrypted area detection process is terminated.

When the variable n is equal to or greater than 3 (Yes in step S1603), the three positioning markers 152 are selected from among the positioning markers 152 detected by the marker detection unit 141 in step S1604, and it is determined whether or not the selected positioning markers 152 form an almost right triangle.

When the selected three positioning markers 152 do not form an almost right triangle (No in step S1605), it is determined whether or not it has been checked as to whether all the positioning markers 152 detected by the marker detection unit 141 form an almost right triangle in step S1606, and when all of them have not been checked (No in step S1606), the process returns to step S1604, and another set of three positioning markers 152 are selected. When all the positioning markers 152 have been checked (Yes in step S1606), the process proceeds to step S1608.

When the selected three positioning markers 152 from an almost right triangle (Yes in step S1605), 1 is assigned to the detection flag reg_detect in step S1607.

In step S1608, it is determined whether or not 1 has been assigned to the detection flag reg_detect, i.e., whether or not three positioning markers 152 forming an almost right triangle have been detected. When 1 has been assigned to reg_detect (Yes in step S1608), the process executes the process of the encryption position detection unit 143. When 1 has not been assigned to reg_detect, (No in step S1608), the decryption process including this encrypted area detection process is terminated.

FIG. 16 is explained again.

The encryption position detection unit 143 utilizes the regular distribution of pixels around the edges of the encrypted area 153 detected by the encrypted area detection unit 142 in order to detect the accurate positions of the respective pixels in the encrypted area 153 by a frequency analysis or a pattern matching method so that the encrypted image 151 can be decrypted accurately. This detection utilizes the fact that the entire encrypted image 151 represents a regular pattern due to the pixel value conversion (inversion) process by the pixel value conversion unit 33.

As an example of a detection method, a method can be used in which a frequency analysis such as a Fast Fourier Transform (FFT) is used to obtain the cycle (width) of the pattern in the vertical and horizontal directions, and thereafter the position of the boundary (offset) is detected by using a template matching method or the like.

It is also possible to utilize the feature wherein the boundary portion is made linear when an edge detection filter (a Laplacian filter, etc) is applied to an encrypted image, and thereby to detect the position of the boundary through a Hough transform.

Figure 19:
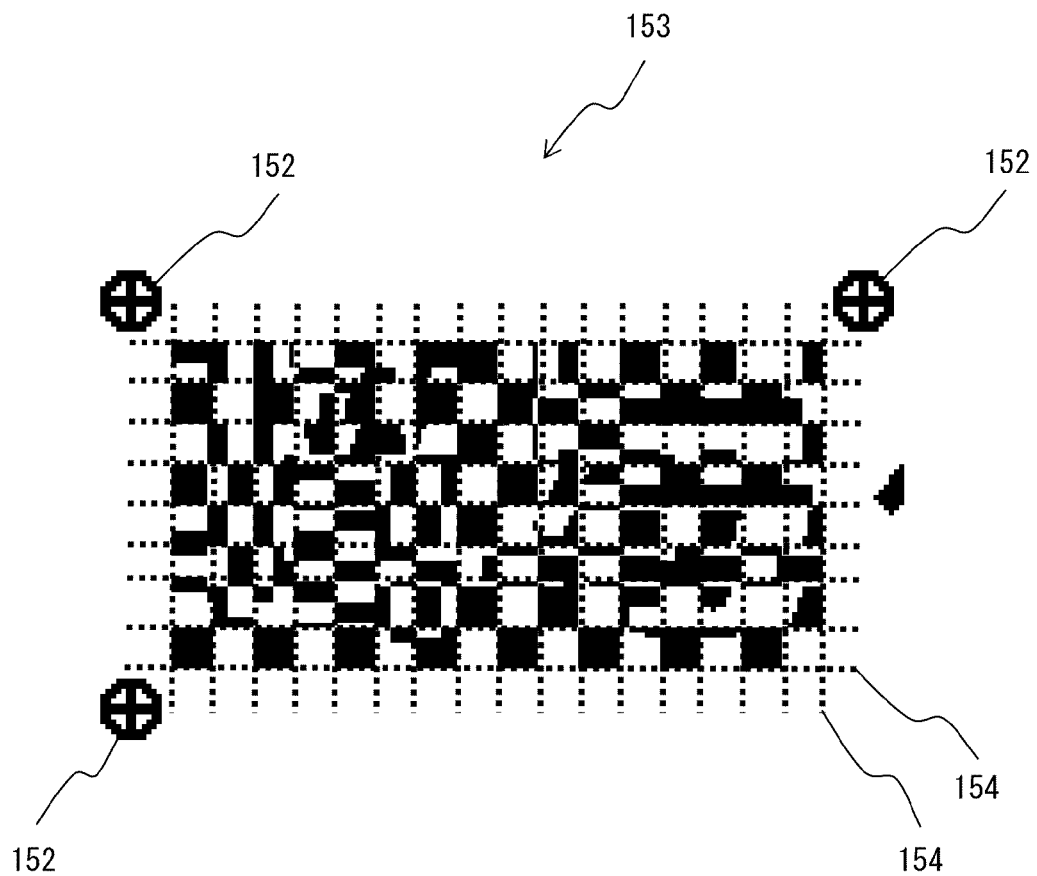
FIG. 19 illustrates an example of detection of the encryption positions.

FIG. 19 illustrates an example of detection of the encryption positions.

When the encrypted digital image 41 has a complicated pattern, the cyclicality in the encrypted image 44 can be lost remarkably. In such a case, it is advantageous to limit the image area for calculation of the cycle of the pattern and boundary positions to a portion having a relatively high cyclicality in order to detect the encryption positions.

FIG. 16 is explained again.

The image inverse conversion unit 144 uses the encryption position information detected by the encryption position detection unit 143 and the decryption key input by the user to execute, in a manner corresponding to the decryption key, an inverse conversion process, which is executed in reverse order to the order of the conversion process by the image conversion unit 32. Thereby, the decrypted image is generated. The decryption can be conducted by executing in the reverse order the process steps for the encryption, and the explanation thereof will be omitted.

The above is an explanation of the first embodiment of the present invention.

Next, a second embodiment of the present invention will be explained.

Figure 20:
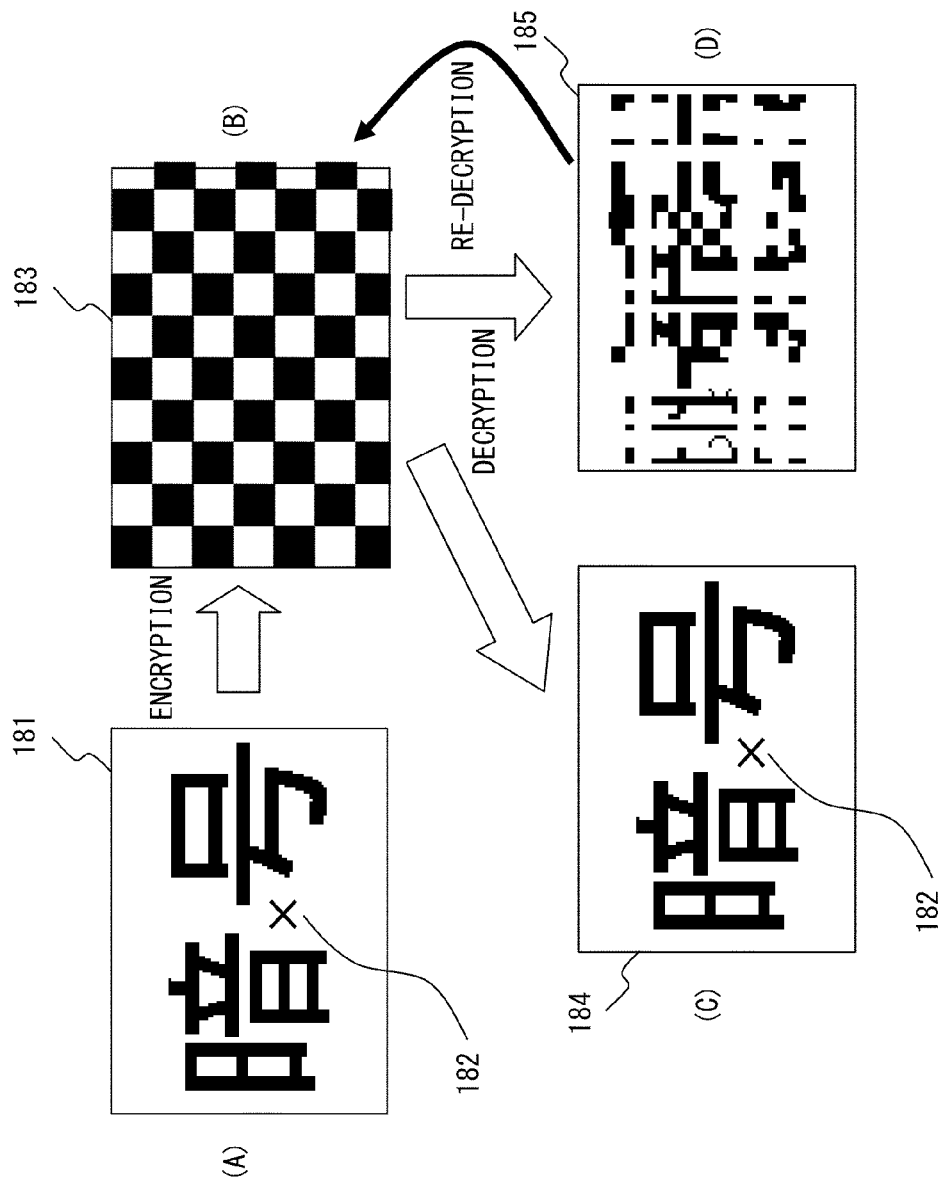
FIG. 20 illustrates the outline of the second embodiment.

FIG. 20 illustrates the outline of the second embodiment.

In the second embodiment, prior to an encryption process, a checking mark 182 for verifying the appropriateness of the decryption by an encrypted image 183 is set at an arbitrary position in an area 181 to be encrypted ((A) in FIG. 20). Thereafter, the image is encrypted ((B) in FIG. 20), and if the checking mark 182 set before the encryption can be detected in a decrypted image 184 after the decryption of the encrypted image 183, it is determined that the image has been successfully decrypted, and the decryption process is terminated ((C) in FIG. 20). When the checking mark 182 is not detected ((D) in FIG. 20), the encrypted position is adjusted and the decryption process is repeated until the checking mark 182 is detected or a specified criterion is met.

Figure 21:
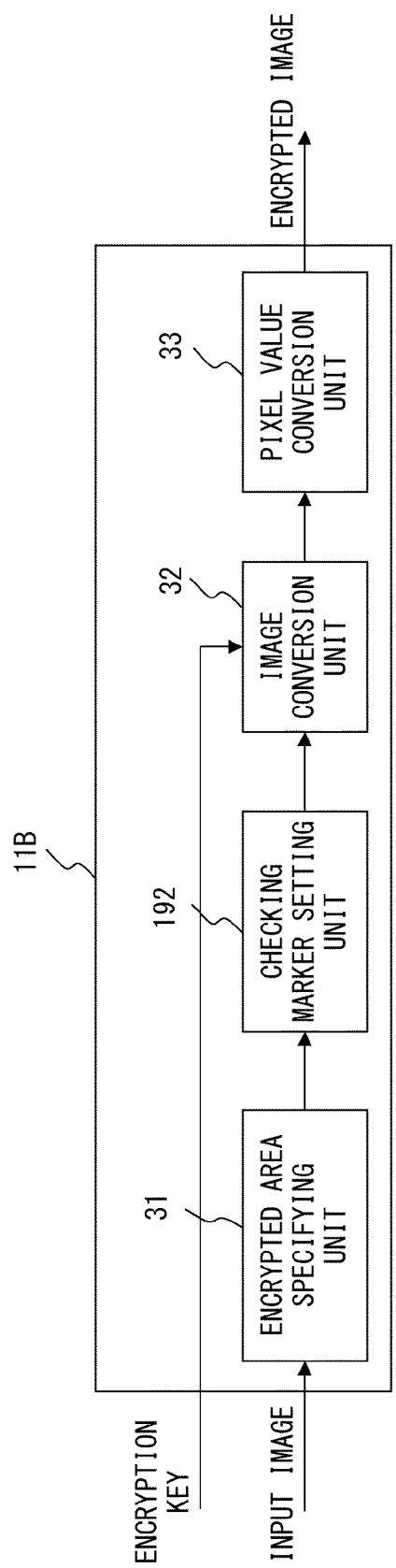
FIG. 21 illustrates the outline of an encryption process in the second embodiment.

FIG. 21 illustrates the outline of an encryption process in the second embodiment.

In FIG. 21, the encryption unit 11B includes an encrypted area specifying unit 31, a checking marker setting unit 192, an image conversion unit 32, and a pixel value conversion unit 33.

Similarly to the first embodiment, the encryption area specifying unit 31 selects an area to be encrypted in an input image.

Thereafter, the checking marker setting unit 192 sets, at an arbitrary point in the area 181 to be encoded, the specific checking mark 182 for verifying the appropriateness of the decryption. It is desirable that the checking mark 182 be set in an area where less information is included and the pixel distribution is flat.

After setting the checking mark 182, the image 181 to be encrypted and the encryption key are input into the image conversion unit 32, and the image in the area 181 to be encrypted is visually converted in a conversion method corresponding to the encryption key, and the pixel value conversion unit 33 converts, at constant intervals, the pixels in the image converted by the image conversion unit 32 so that the converted image approximately represents a checkerboard pattern.

Figure 22:
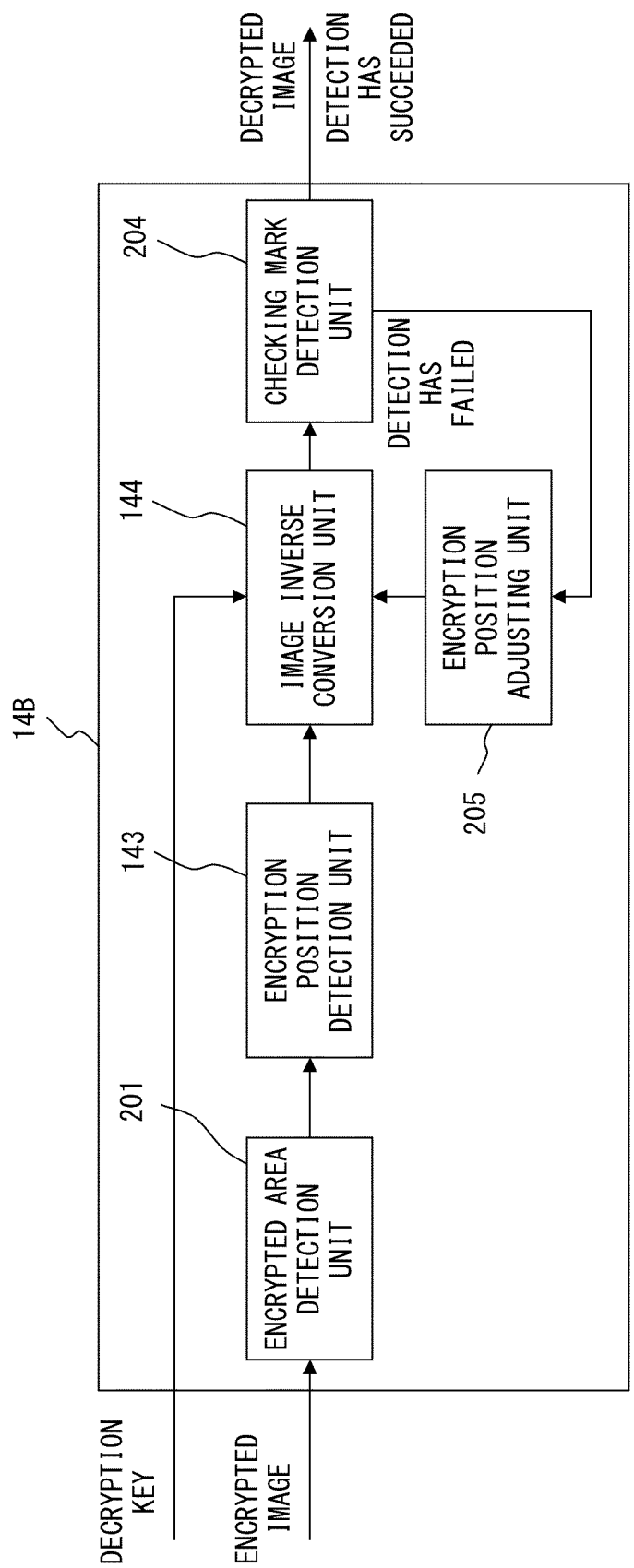
FIG. 22 illustrates the outline of a decryption process in the second embodiment.

FIG. 22 illustrates the outline of a decryption process in the second embodiment.

In FIG. 22, the decryption unit includes an encrypted area detection unit 201, an encryption position detection unit 143, an image inverse conversion unit 144, a checking mark detection unit 204, and an encryption position adjusting unit 205.

First, the encrypted area detection unit 201 roughly detects the area of the encrypted image 183. Because the encryption process by the encryption unit 11B has caused the pixel distribution in the encrypted image 183 to approximately represent a checkerboard pattern, a frequency analysis such as an FFT or the like performed in the horizontal and vertical directions remarkably increases the power of the frequency that corresponds to the cycle of the stripes.

Figure 23:
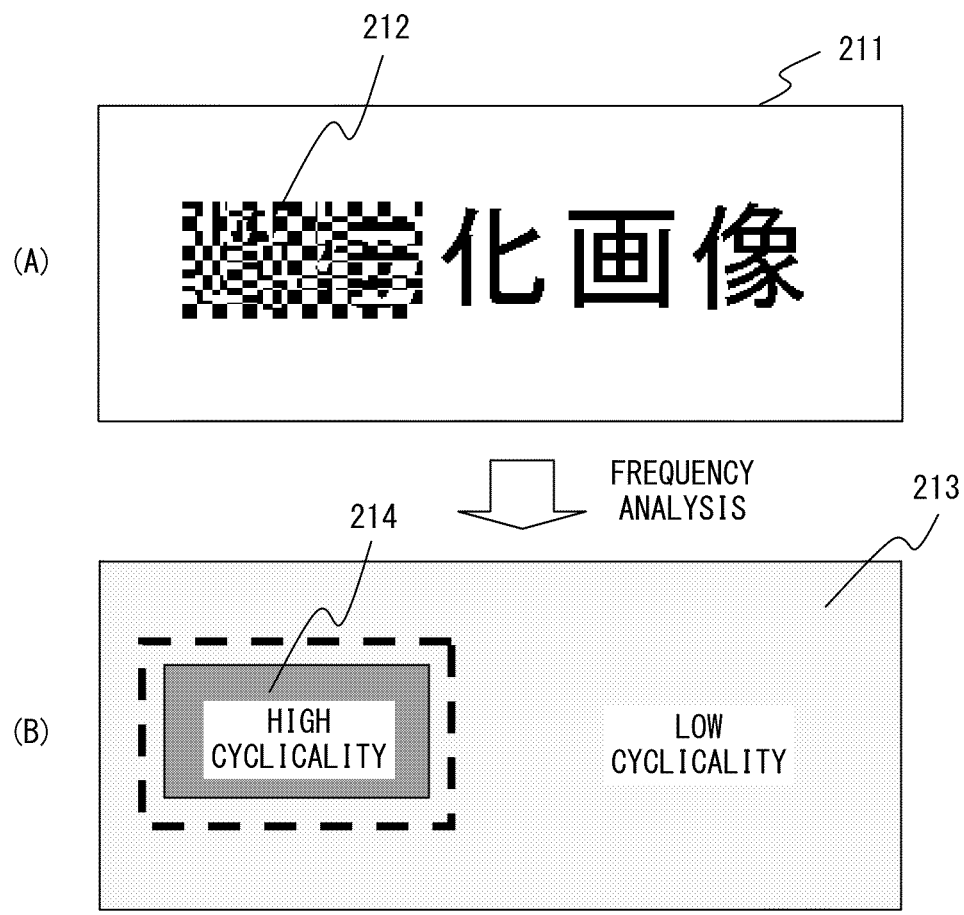
FIG. 23 illustrates a method of detecting an encrypted area.

FIG. 23 illustrates a method of detecting an encrypted area.

As indicated by (A) in FIG. 23, when a frequency analysis is performed on an encrypted image 211, an area in which the power of a certain frequency (the frequencies of integral multiples of the analyzed frequency) increases remarkably is made, and this area is denoted by "high cyclicality" 214. The cyclicality of pixel distribution tends to become higher in an encrypted area, making it possible to roughly detect the encrypted area and the cycle of the stripes.

FIG. 22 is explained again.

After the encrypted area detection unit 201 has roughly located the encrypted area, the encryption position detection unit 143 detects the encrypted area more accurately, and detects detailed positions of the respective pixels in the encrypted area. As an example of the position detection, the boundary position (offset) of the pixel value conversion is first obtained from the distribution of the cycle of the stripes obtained by the encrypted area detection unit 201 and the pixel absolute value difference, and the scope containing the area having a relatively large pixel absolute value difference is narrowed. It is also possible to employ a Hough transform for the encryption position detection similarly to the encryption position detection unit 143 in the first embodiment.

FIG. 24 illustrates a method of detecting encryption positions (horizontal directions).

Performing the above process of detecting the encrypted area in the horizontal and vertical directions results in the detection of encryption positions 221 as illustrated in FIG. 24.

FIG. 22 is explained again.

The image inverse conversion unit 144 uses the encryption position information and the decryption key in order to generate the decrypted image in the same manner as in the first embodiment.

The checking mark detection unit 204 attempts to detect a checking mark in the decrypted image obtained by the image inverse conversion unit 144. The method of the detection is the same as the marker detection in the first embodiment, and the explanation of the checking mark detection method is omitted. When a checking mark is detected, the decrypted image is output and the process is terminated. When a checking mark is not detected, the encryption position adjusting unit 205 adjusts the encryption position, and the decryption process (image inverse conversion process) is repeated until a checking mark is detected or a specified criterion is met.

Figure 25:
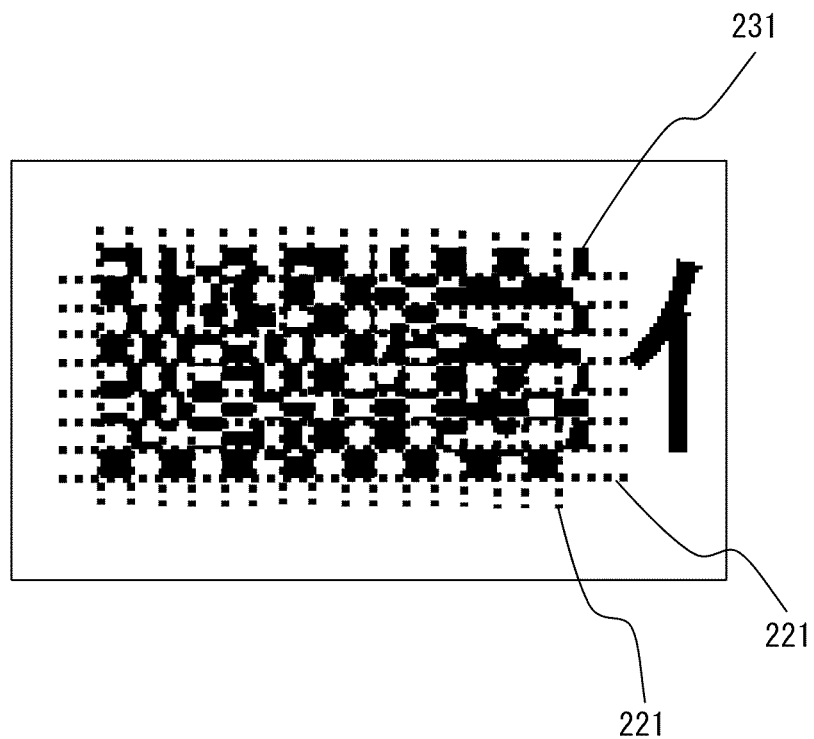
FIG. 25 illustrates an example of an error in detection of encryption positions.

FIG. 25 illustrates an example of an error in detection of encryption positions.

As illustrated in FIG. 25, an edge of the encrypted image can sometimes fail to be detected (omitted line 231). In order to cope with this failure, when the detection of the encryption positions 221 has failed, an image inverse conversion process is performed after adding or deleting lines indicating encryption positions to or from the left and right edges or the top and bottom edges so that it is checked whether the encryption positions 221 can be detected. When the encryption positions 221 cannot be detected even when the lines are added or deleted in all the possible manners, the process is terminated without outputting the decrypted image.

The above is an explanation of the second embodiment of the present invention.

Next, a third embodiment of the present invention will be explained.

In the third embodiment, images are encrypted and decrypted using both the positioning markers for locating the encrypted area used in the first embodiment and the checking marks used for determining the appropriateness of the decrypted image used in the second embodiment. The use of positioning markers for detecting positions and checking marks for confirming the decrypted image can reduce decryption errors when a correct decryption key is input.

Figure 26:
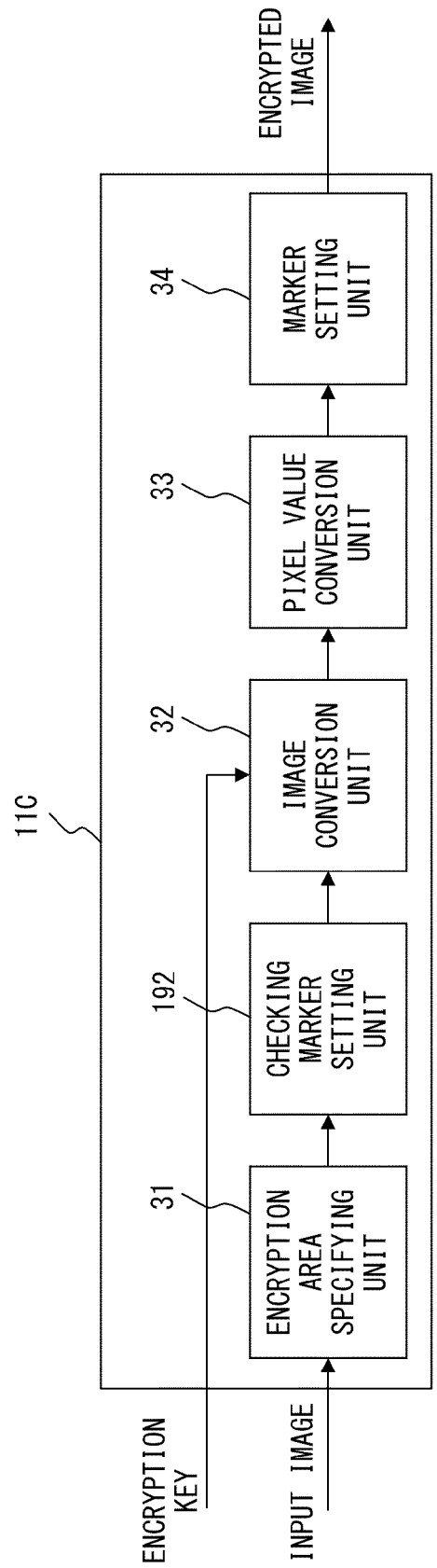
FIG. 26 illustrates the outline of an encryption process in the third embodiment.

FIG. 26 illustrates the outline of an encryption process in the third embodiment.

In FIG. 26, the encryption unit 11C includes the encryption area specifying unit 31, the checking marker setting unit 192, the image conversion unit 32, the pixel value conversion unit 33, and the marker setting unit 34.

First, the encryption area specifying unit 31 selects an area to be encrypted, and the checking marker setting unit 192 sets a checking mark for verifying the decryption in the same manner as in the second embodiment. After the checking mark is set, the image conversion unit 32 and the pixel value conversion unit 33 encrypt the image in the same manner as in the first and second embodiments, and the marker setting unit 34 sets a positioning marker for detecting the encrypted area in the same manner as in the first embodiment. Because these processes are the same as in the first and second embodiments, the explanations thereof are omitted.

Figure 27:
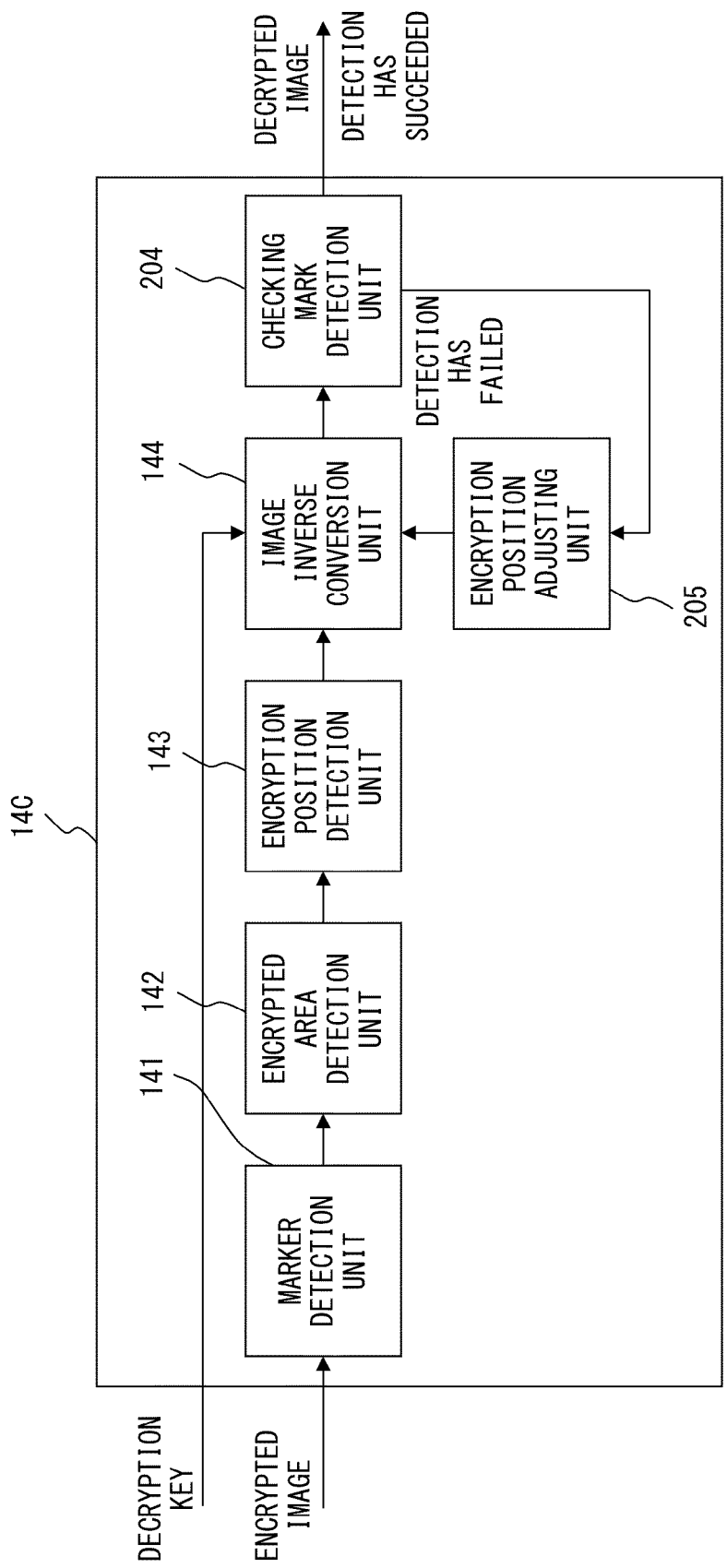
FIG. 27 illustrates the outline of a decryption process in the third embodiment.

FIG. 27 illustrates the outline of a decryption process in the third embodiment.

In FIG. 27, the decryption unit 14C includes a marker detection unit 141, the encrypted area detection unit 142, the encryption position detection unit 143, the image inverse conversion unit 144, the checking mark detection unit 204, and the encryption position adjusting unit 205.

First, the marker detection unit 141 detects a positioning marker in the same manner as in the first embodiment, and the encrypted area detection unit 142 detects the encrypted area in the same manner as in the first embodiment. The encryption position detection unit 143 detects detailed positions of the respective pixels in the encrypted area in the same manner as in the first embodiment. The processes performed by the image inverse conversion unit 144, the checking mark detection unit 204, and the encryption position adjusting unit 205 are the same as in the second embodiment, and the explanations thereof are omitted.

The above is an explanation of the third embodiment.

Although the embodiments of the present invention have been explained by referring to the drawings, the encryption process and the decryption process to which the present invention is applied is not limited to any of the above embodiments as long as the functions of such processes are performed, and they can be in the form of a simplex device, a system or integrated apparatus including plural devices, or a system in which the processes are executed via a network such as a LAN, a WAN, etc.

Also, as illustrated in FIG. 28, the encryption process and the decryption process can be implemented by a system consisting of a CPU 2601, a memory device 2602 such as ROM or RAM, an input device 2603, an output device 2604, an external storage device 2605, a medium driving device 2606, a transportable storage medium 2609, and a network connection device 2607, all of which are connected to a bus 2608. Specifically, they can be implemented by a configuration in which the memory 2602 such as ROM or RAM, the external storage device 2605, and the transportable storage medium 2609 storing program codes of the software realizing the system of the above mentioned embodiments are provided to an information processing apparatus, and the information processing apparatus reads and executes the program codes.

In such a case, the program codes themselves read from the transportable storage medium 2609 or the like realize the novel functions of the present invention, and the transportable storage medium 2609 or the like storing the program codes is a part of the present invention.

Examples of the transportable storage medium 2609 for providing the program codes are a floppy disk, a hard disk, an optical disk, a magneto-optical disk, CD-ROM, a CD-R, DVD-ROM, DVD-RAM, magnetic tape, a non-volatile memory card, a ROM card, and various storage devices in which information has been stored via the network connection device 2607 (or communication lines) for E-mail, personal computer communications, etc.

Also, as illustrated in FIG. 29, reading and executing of the program codes by a computer can implement the functions in the above mentioned embodiments. Further, partial or overall execution of the processes by the OS on a computer on the basis of the instructions in the program codes can implement the functions in the above mentioned embodiments as well.

Further, when the program codes read from the transportable storage medium 2609 or a program (data) provided from a program (data) provider is written into the memory device 2602 provided to a function expansion unit connected to a computer or a function expansion board inserted into a computer, and the CPU 2601 or the like in the function expansion unit or the function expansion board executes a part or the whole of the processes on the basis of the instructions in the program codes, the executed processes can implement the functions of the above mentioned embodiments.

In other words, the scope of the present invention is not limited to any of the above embodiments, and various configurations and shapes can be employed without departing from the spirit of the present invention.

What is claimed is:

1. An image encryption device that encrypts a digital image into an encrypted image, comprising:
   encryption area specifying means for specifying a partial area to be encrypted in the digital image;
   image conversion means for converting the partial area selected by the encryption area specifying means into a processed image on the basis of an encryption key;
   pixel value conversion means for generating a converted image by regularly converting pixel values of the processed image obtained through the conversion by the image conversion means so that a position of the partial area can be located; and
   marker setting means for setting a specified marker in the converted image generated by the pixel value conversion means, wherein:
   the image conversion means converts the partial area into compressed data using an arbitrary compression method, and arranges each bit of the converted compressed data as a white pixel or a black pixel of an arbitrary size, and
   the pixel value conversion means converts the pixel values in a constant cycle in horizontal and vertical directions in the processed image and generates a converted image substantially representing a checkerboard pattern.

2. The image encryption device according to claim 1, wherein:
   the image conversion means divides the partial area into a plurality of micro areas, and rearranges the plurality of divisional micro areas on the basis of the encryption key.

3. The image encryption device according to claim 1, further comprising marker setting means for setting a specified marker in the converted image generated by the pixel value conversion means, and thereby generating the encrypted image in order to locate a position of the partial area.

4. The image encryption device according to claim 3 wherein:
   the marker is a circle or a polygon that is drawn with a solid line and that contains a plurality of lines crossing a circumference of the circle or the polygon.

5. The image encryption device according to claim 4, wherein a foreground of the marker is formed by a pixel value conversion.

6. The image encryption device according to claim 5, further comprising checking mark setting means for setting, before the encryption area specifying means specifies a partial area, in the digital image a specified checking mark for verifying appropriateness of decryption of the encrypted image.

7. An image decryption device that decrypts an encrypted image into a digital image, comprising:
   marker setting means for setting a specified marker in the encrypted image;
   marker detection means for detecting a specified marker set in the encrypted image in order to locate a position of a partial area that was encrypted;
   encrypted area detection means for detecting an encrypted image area on the basis of the marker detected by the marker detection means;
   encryption position detection means for detecting an encryption position around which pixel values are converted regularly in the encrypted image area detected by the encrypted area detection means; and
   decryption means for decrypting the encrypted image area into the digital image on the basis of the encryption position detected by the encryption position detection means and a decryption key,
   converting means converting the partial area into compressed data using an arbitrary compression method, arranging each bit of the converted compressed data as a white pixel or a black pixel of an arbitrary size, and converting the pixel values in a constant cycle in horizontal and vertical directions in the processed image and generating a converted image substantially representing a checkerboard pattern.

8. An image decryption device that decrypts an encrypted image into a digital image, comprising:
   marker setting means for setting a specified marker in the encrypted image;
   encrypted area detection means for detecting an encrypted image area;
   encryption position detection means for detecting an encryption position around which pixel values are converted regularly in the encrypted image area detected by the encrypted area detection means;
   decryption means for decrypting the encrypted image area into the digital image on the basis of the encryption position detected by the encryption position detection means and a decryption key; and
   checking mark detection means for detecting a specified checking mark for verifying appropriateness of decryption on the basis of the digital image obtained by decryption by the decryption means,
   converting means converting the partial area into compressed data using an arbitrary compression method, arranging each bit of the converted compressed data as a white pixel or a black pixel of an arbitrary size, and converting the pixel values in a constant cycle in horizontal and vertical directions in the processed image and generating a converted image substantially representing a checkerboard pattern.

9. An image decryption device that decrypts an encrypted image into a digital image, comprising:
   marker setting means for setting a specified marker in the encrypted image;
   marker detection means for detecting a specified marker set in the encrypted image in order to locate a position of a partial area that was encrypted;
   encrypted area detection means for detecting an encrypted image area on the basis of the marker detected by the marker detection means;
   encryption position detection means for detecting an encryption position around which pixel values are converted regularly in the encrypted image area detected by the encrypted area detection means;
   decryption means for decrypting the encrypted image area into the digital image on the basis of the encryption position detected by the encryption position detection means and a decryption key; and
   checking mark detection means for detecting a specified checking mark for verifying appropriateness of decryption on the basis of the digital image obtained by decryption by the decryption means,
   converting means converting the partial area into compressed data using an arbitrary compression method, arranging each bit of the converted compressed data as a white pixel or a black pixel of an arbitrary size, and converting the pixel values in a constant cycle in horizontal and vertical directions in the processed image and generating a converted image substantially representing a checkerboard pattern.

10. The image decryption device according to claim 9, further comprising encryption position adjusting means for adjusting the encryption position detected by the encryption position detection means when a checking mark is not detected by the checking mark detection means.

11. The image decryption device according to claim 10, wherein the encrypted image is an image encrypted by an image encryption device including
encryption area specifying means for specifying a partial area to be encrypted in the digital image;
image conversion means for converting the partial area selected by the encryption area specifying means into a processed image on the basis of an encryption key; and
pixel value conversion means for generating a converted image by regularly converting pixel values of the processed image obtained through the conversion by the image conversion means so that a position of the partial area can be located.

12. The image decryption device according to claim 10, wherein the encrypted image is an image obtained by printing an image encrypted by an image encryption device reading the printed image and including
encryption area specifying means for specifying a partial area to be encrypted in the digital image;
image conversion means for converting the partial area selected by the encryption area specifying means into a processed image on the basis of an encryption key; and
pixel value conversion means for generating a converted image by regularly converting pixel values of the processed image obtained through the conversion by the image conversion means so that a position of the partial area can be located.

13. A method of encrypting an image executed in an image encryption device that encrypts a digital image into an encrypted image, comprising:
specifying a partial area to be encrypted in the digital image;
converting the selected partial area into a processed image on the basis of an encryption key;
generating a converted image by regularly converting pixel values of the processed image obtained through the conversion so that a position of the partial area can be located; and
setting a specified marker in the converted image generated by the generating, wherein:
converting the partial area into compressed data using an arbitrary compression method, and arranging each bit of the converted compressed data as a white pixel or a black pixel of an arbitrary size, and
converting the pixel values in a constant cycle in horizontal and vertical directions in the processed image and generating a converted image substantially representing a checkerboard pattern.

14. The method of encrypting an image according to claim 13, further comprising setting a specified marker in the generated converted image, and thereby generating the encrypted image in order to locate a position of the partial area.

15. A method of decrypting an image executed in an image decryption device that decrypts an encrypted image into a digital image, comprising:
setting a specified marker in the encrypted image;
detecting a specified marker set in the encrypted image in order to locate a position of a partial area that was encrypted;
detecting an encrypted image area on the basis of the detected marker;
detecting an encryption position around which pixel values are converted regularly in the detected encrypted image area; and
decrypting the encrypted image area into the digital image on the basis of the detected encryption position and a decryption key,
converting means converting the partial area into compressed data using an arbitrary compression method, arranging each bit of the converted compressed data as a white pixel or a black pixel of an arbitrary size, and converting the pixel values in a constant cycle in horizontal and vertical directions in the processed image and generating a converted image substantially representing a checkerboard pattern.

16. A method of decrypting an image executed in an image decryption device that decrypts an encrypted image into a digital image, comprising:
setting a specified marker in the encrypted image;
detecting an encrypted image area;
detecting an encryption position around which pixel values are converted regularly in the detected encrypted image area;
decrypting the encrypted image area into the digital image on the basis of the detected encryption position and a decryption key; and
detecting a specified checking mark for verifying appropriateness of decryption on the basis of the digital image obtained by decryption,
converting means converting the partial area into compressed data using an arbitrary compression method, arranging each bit of the converted compressed data as a white pixel or a black pixel of an arbitrary size, and converting the pixel values in a constant cycle in horizontal and vertical directions in the processed image and generating a converted image substantially representing a checkerboard pattern.

17. A method of decrypting an image executed in an image decryption device that decrypts an encrypted image into a digital image, comprising:
setting a specified marker in the encrypted image;
detecting a specified marker set in the encrypted image in order to locate a position of a partial area that was encrypted;
detecting an encrypted image area on the basis of the detected marker;
detecting an encryption position around which pixel values are converted regularly in the detected encrypted image area;
decrypting the encrypted image area into the digital image on the basis of the detected encryption position and a decryption key; and
detecting a specified checking mark for verifying appropriateness of decryption on the basis of the digital image obtained by decryption,
converting means converting the partial area into compressed data using an arbitrary compression method, arranging each bit of the converted compressed data as a white pixel or a black pixel of an arbitrary size, and converting the pixel values in a constant cycle in horizontal and vertical directions in the processed image and generating a converted image substantially representing a checkerboard pattern.

18. A computer-readable, non-transitory medium storing an image encryption program used to direct a computer of an image encryption device to execute a process to encrypt a digital image into an encrypted image, the process comprising:

encryption area specifying means for specifying a partial area to be encrypted in the digital image;

image conversion means for converting the partial area selected by the encryption area specifying means into a processed image on the basis of an encryption key;

pixel value conversion means for generating a converted image by regularly converting pixel values of the processed image obtained through the conversion by the image conversion means so that a position of the partial area can be located; and marker setting means for setting a specified marker in the converted image generated by the pixel value conversion means, wherein:

the image conversion means converts the partial area into compressed data using an arbitrary compression method, and arranges each bit of the converted compressed data as a white pixel or a black pixel of an arbitrary size, and the pixel value conversion means converts the pixel values in a constant cycle in horizontal and vertical directions in the processed image and generates a converted image substantially representing a checkerboard pattern.

19. The computer-readable, non-transitory medium according to claim 18, further comprising:

marker setting means for setting a specified marker in the converted image generated by the pixel value conversion means, and thereby generating the encrypted image in order to locate a position of the partial area.

20. A computer-readable, non-transitory medium storing an image decryption program used to direct a computer of an image decryption device to execute a process to encrypt an encrypted image into a digital image, the process comprising:

marker setting means for setting a specified marker in the encrypted image;

marker detection means for detecting a specified marker set in the encrypted image in order to locate a position of a partial area that was encrypted;

encrypted area detection means for detecting an encrypted image area on the basis of the marker detected by the marker detection means;

encryption position detection means for detecting an encryption position around which pixel values are converted regularly in the encrypted image area detected by the encrypted area detection means; and decryption means for decrypting the encrypted image area into the digital image on the basis of the encryption position detected by the encryption position detection means and a decryption key, converting means converting the partial area into compressed data using an arbitrary compression method, arranging each bit of the converted compressed data as a white pixel or a black pixel of an arbitrary size, and converting the pixel values in a constant cycle in horizontal and vertical directions in the processed image and generating a converted image substantially representing a checkerboard pattern.

21. A computer-readable, non-transitory medium storing an image decryption program used to direct a computer of an image decryption device to execute a process to encrypt an encrypted image into a digital image, the process comprising:

marker setting means for setting a specified marker in the encrypted image;

encrypted area detection means for detecting an encrypted image area;

encryption position detection means for detecting an encryption position around which pixel values are converted regularly in the encrypted image area detected by the encrypted area detection means;

decryption means for decrypting the encrypted image area into the digital image on the basis of the encryption position detected by the encryption position detection means and a decryption key; and checking mark detection means for detecting a specified checking mark for verifying appropriateness of decryption on the basis of the digital image obtained by decryption by the decryption means, converting means converting the partial area into compressed data using an arbitrary compression method, arranging each bit of the converted compressed data as a white pixel or a black pixel of an arbitrary size, and converting the pixel values in a constant cycle in horizontal and vertical directions in the processed image and generating a converted image substantially representing a checkerboard pattern.

22. A computer-readable, non-transitory medium storing an image decryption program used to direct a computer of an image decryption device to execute a process to encrypt an encrypted image into a digital image, the process comprising:

marker setting means for setting a specified marker in the encrypted image;

marker detection means for detecting a specified marker set in the encrypted image in order to locate a position of a partial area that was encrypted;

encrypted area detection means for detecting an encrypted image area on the basis of the marker detected by the marker detection means;

encryption position detection means for detecting an encryption position around which pixel values are converted regularly in the encrypted image area detected by the encrypted area detection means;

decryption means for decrypting the encrypted image area into the digital image on the basis of the encryption position detected by the encryption position detection means and a decryption key; and checking mark detection means for detecting a specified checking mark for verifying appropriateness of decryption on the basis of the digital image obtained by decryption by the decryption means, converting means converting the partial area into compressed data using an arbitrary compression method, arranging each bit of the converted compressed data as a white pixel or a black pixel of an arbitrary size, and converting the pixel values in a constant cycle in horizontal and vertical directions in the processed image and generating a converted image substantially representing a checkerboard pattern.

* * * * *